(12) United States Patent
Gaßner

(10) Patent No.: US 10,865,045 B2
(45) Date of Patent: Dec. 15, 2020

(54) CHAIN LINK, CONVEYING CHAIN AND CHAIN CONVEYOR

(71) Applicant: GASSNER VERWALTUNGS-GMBH, Salzburg (AT)

(72) Inventor: Wolfgang Gaßner, Frankenmarkt (AT)

(73) Assignee: GASSNER VERWALTUNGS-GMBH, Salzburg (AT)

( * ) Notice: Subject to any disclaimer, the term of this patent is extended or adjusted under 35 U.S.C. 154(b) by 0 days.

(21) Appl. No.: 16/645,918

(22) PCT Filed: Sep. 11, 2018

(86) PCT No.: PCT/EP2018/074473
§ 371 (c)(1),
(2) Date: Mar. 10, 2020

(87) PCT Pub. No.: WO2019/048704
PCT Pub. Date: Mar. 14, 2019

(65) Prior Publication Data
US 2020/0277141 A1 Sep. 3, 2020

(30) Foreign Application Priority Data
Sep. 11, 2017 (AT) ............................ GM50166/2017

(51) Int. Cl.
*B65G 17/06* (2006.01)
*B65G 17/46* (2006.01)
(Continued)

(52) U.S. Cl.
CPC ......... *B65G 17/065* (2013.01); *B65G 17/323* (2013.01); *B65G 17/40* (2013.01);
(Continued)

(58) Field of Classification Search
CPC ...... B65G 17/065; B65G 17/40; B65G 17/46; B65G 47/763; B65G 2201/0235; B65G 17/323
See application file for complete search history.

(56) References Cited

U.S. PATENT DOCUMENTS 4,807,421 A * 2/1989 Araki ........................ A23L 3/04
198/803.11
5,000,311 A * 3/1991 Abbestam .............. B65G 17/42
198/867.14
(Continued)

FOREIGN PATENT DOCUMENTS

DE 102 07 687 9/2003
EP 2 292 536 3/2011
(Continued)

OTHER PUBLICATIONS

Int'l Search Report (Form PCT/ISA/210) conducted in Int'l Appln. No. PCT/EP2018/047773 (dated Dec. 19, 2018).
(Continued)

*Primary Examiner* — Mark A Deuble
(74) *Attorney, Agent, or Firm* — Greenblum & Bernstein, P.L.C.

(57) ABSTRACT

The invention relates to a chain link (1) for a chain conveyor for conveying small parts (17), in particular bottle closures, having a, in particular flat, support surface for small parts, wherein means (3) for fitting at least one carrier (14) are provided on opposite sides of the chain link. This allows the small parts to be conveyed without damage, on the other hand, the chain link (1) can be easily adapted to different types of small parts that differ in diameter and/or height. At least two carriers (14) are provided, each of which has a fastening part (15) which can be attached to a means (3) for fitting, and a gripping part (19) which is made of a softer material than the fastening part (15) and has one or more
(Continued)

extensions (16) which, when the carrier (14) is in the fitted state, are aligned towards the respective other carrier (14).

27 Claims, 17 Drawing Sheets

(51) Int. Cl.
*B65G 47/76* (2006.01)
*B65G 17/40* (2006.01)
*B65G 17/32* (2006.01)

(52) U.S. Cl.
CPC .......... *B65G 17/46* (2013.01); *B65G 47/763* (2013.01); *B65G 2201/0235* (2013.01)

(56) References Cited

U.S. PATENT DOCUMENTS

| | | | |
|---|---|---|---|
| 8,348,049 B2 | 1/2013 | Öhman et al. | |
| 9,527,671 B2 | 12/2016 | Marshall et al. | |
| 9,701,478 B1* | 7/2017 | Leslie | B65G 17/44 |
| 9,840,370 B2* | 12/2017 | Corlett | B65G 15/42 |
| 2005/0103606 A1* | 5/2005 | Hartness | B65G 17/323 |
| | | | 198/850 |
| 2005/0269188 A1 | 12/2005 | Hartness et al. | |
| 2010/0243408 A1 | 9/2010 | Öhman et al. | |
| 2015/0183584 A1 | 7/2015 | Marshall et al. | |

FOREIGN PATENT DOCUMENTS

| | | |
|---|---|---|
| WO | 2007/142559 | 12/2007 |
| WO | 2014/018544 | 1/2014 |

OTHER PUBLICATIONS

Austria Search Report conducted in counterpart Austria Appln. No. 1A GM 50166/2017 (dated Apr. 18, 2018).

* cited by examiner

CHAIN LINK, CONVEYING CHAIN AND CHAIN CONVEYOR

FIELD OF INVENTION

The present invention relates to a chain link for a chain conveyor for conveying small parts, in particular bottle closures, having a, in particular flat, support surface for small parts, wherein means for fitting at least one carrier are provided on opposite sides of the chain link. The invention also relates to a conveyor chain made of such chain links and a chain conveyor.

DESCRIPTION OF THE PRIOR ART

Small parts, such as bottle closures, which are already pre-oriented, are usually transported horizontally by belt conveyors or by air conveyors. Air conveyors can also negotiate inclines at a slightly rising angle, with gradients of 10° to 30° being possible depending on the type, shape and material of the closures. The steeper the ascent, the higher the air pressure required. The energy demand increases very strongly, at the same time the abrasion of the closures increases, and the method is then no longer gentle and, due to the abrasion in connection with the air turbulence created, no longer hygienic. The conveying of bottle closures over steep inclines is therefore not possible with known air conveyors in a hygienically viable manner.

Furthermore, conveyors operating in a friction-locked manner are known from other areas of conveyor technology, e.g. so-called clamp jaw conveyors. The transported material is clamped by clamping elements or clamping jaws and transported upwards. However, sensitive small parts, such as thin-walled bottle closures made of plastic or metal, cannot be transported non-destructively in this way, as they cannot withstand the clamping pressure of the clamping jaws on both sides and deform. This applies all the more as bottle closures are constantly being made thinner due to material-saving measures.

A conveyor chain is known from US 2005/269188 A1, which comprises several links, each of which has two opposite gripping elements 423 with rigid adaptors 492 (FIG. 6).

Conveyors are also known where small parts are clamped between two circulating flat belts. Both clamp jaw conveyors and flat belt conveyors are only suitable for making curves in one plane and are therefore only used to negotiate vertical sections or to overcome the difference in height on inclined sections.

Even if, with two circulating flat belts, only a small contact pressure is applied between the two flat belts, it is still difficult to achieve a constant distance between the flat belts along the entire conveyor section so that the small part in between is always clamped with the same degree of force. In addition, it is difficult to set a suitable distance and contact pressure for changing types of small parts, such as different types of closures.

OBJECT OF THE INVENTION

The invention is therefore based on the object of providing means for conveying small parts, in particular bottle closures, which avoid the disadvantages mentioned above and allow the small parts to be conveyed without damaging the small parts, but which on the other hand can be easily adapted to different types of small parts which differ in diameter and/or height.

SUMMARY OF THE INVENTION

The set object is solved by a chain link for a chain conveyor for conveying small parts, in particular bottle closures, having an, in particular flat, support surface for small parts, wherein means for fitting at least one carrier are provided on opposite sides of the chain link, in that at least two carriers are provided, each of which has a fastening part which can be plugged onto a means for fitting, and a gripping part which is made of a softer material than the fastening part and has one or more extensions which, when the carrier is fitted, are aligned towards the other carrier in each case.

These carriers can be selected in their dimensions according to the height measured normal to the support surface and/or the diameter measured parallel to the support surface and can be fitted to the chain link. The fact that no carriers are fixed to the chain link or are made in one piece with it means that the carriers can be changed.

The fact that the means for fitting at least one carrier are arranged on opposite sides means that a small part located between the means can be held between the carriers by the carriers fitted on both sides. This means that the position of the small part is not only determined by the support surface of the chain link, but also by the carriers, so that the support surface can deviate from the horizontal during operation of a corresponding chain conveyor and the small part is still held in position by the carriers.

However, the chain links can also be used without carriers, for example, if only horizontal conveying is used. In this case, no means for fitting at least one carrier would have to be provided. On the other hand, it is also conceivable that the chain links have no support surface for small parts and the small parts are held only by the carriers.

The chain link will normally be symmetrical to its conveying direction and accordingly the at least two means for fitting a carrier with respect to the conveying direction are normally designed identical and symmetrical to each other. However, it is also possible to fit two differently designed carriers to one chain link. In this case, however, the carriers on one side of the entire conveyor chain should all be the same for all chain links, i.e. the same type of carriers on the left, as seen in the conveying direction, and a different type on the right than on the left, but the same among each other.

At least two carriers are provided per chain link, which can hold, in particular clamp, a small part between them in the assembled state. Each of the two carriers has a fastening part which can be attached to a means for fitting and a gripping part which is made of a softer material than the fastening part and has one or more extensions which, when the carrier is fitted, are directed towards the other carrier. When assembled, these extensions are then long enough to engage with a small part, in particular a bottle closure, which is located on the support surface of the chain link.

Carriers with different lengths of the extensions can be provided in order to hold small parts of different diameters or to produce different flexibility of the extensions. The heights of the carriers, especially the gripping parts with the extensions, can also be different in order to be able to hold small parts of different heights. The height is measured normal to the support surface of the chain link.

The gripping part can have only one extension or several. A gripping part with an extension is used, for example, when robust small parts are conveyed.

In particular, it may be provided that the means for fitting a carrier are designed as wing-like projections which are aligned transversely to a conveying direction of the chain link. In particular, the projections can be aligned normal to the direction of conveyance. As seen in conveying direction, there is, for example, one projection on the left and one on the right of the chain link. A carrier can be pushed or fitted onto each of these projections. The two flanks of a projection are therefore parallel to each other at least in sections, in particular the projection itself can have the same width at least in sections transverse to the direction of conveyance.

It may be provided that the means for fitting have a toothing which enables them to be interlocked or locked with a carrier. The projection in particular can have specially designed contact surfaces for the carriers to influence the movement of the carriers on the projection. For example, the contact surfaces can be designed in a serrated or ribbed manner at right angles to the direction in which the carrier is fitted. Alternatively or in addition, the projection can also be designed in the form of a rail in order to enable or facilitate the fitting and movement of appropriately shaped carriers. The projection can also have a latching element, such as one or more protrusions, onto which a carrier can latch, which has corresponding latching elements, such as recesses. As an alternative to toothing, bores (holes) or slots can also be provided on the projections, into which carriers provided with suitable counterparts can be inserted and engaged.

In order that a conveyor chain formed from the chain links according to the invention can be guided in the conveying direction out of the conveying plane in a curve upwards or downwards, it must be possible to pivot the chain links against each other normal to the conveying direction. This can be advantageously achieved in such a way that on the side of the chain link facing away from the support surface there is at least one head part and a fork part with two legs opposite the head part in the conveying direction, wherein the fork part is designed in such a way that the head part of one chain link can be inserted between the legs of the fork part of a following chain link. The support surfaces can then form a substantially continuous support surface.

In this inserted position, two chain links can then be connected to each other in an articulated manner by providing, for example, that the head part and the fork part, in particular its legs, have openings for receiving a chain pin for the articulated connection of two chain links. The chain pin, when the head part of one chain link is inserted between the legs of the fork part of a following chain link, can be pushed through the openings of the head part of one chain link and the fork part of the other chain link, which are aligned in this position, and fixed against slipping out either at the head part or at the fork part.

In order that a conveyor chain formed from the chain links according to the invention can be guided in a curve to the left or to the right in the conveying plane, it must be possible to pivot the chain links against each other in the plane of the support surfaces normal to the conveying direction. This can be advantageously achieved in such a way that the head part has a cavity for receiving a traction piece which can rotate in the cavity, wherein the formation of the cavity defines an axis of rotation of the traction piece normal to the conveying direction of the chain link, in particular normal to the support surface, and wherein the openings in the head part are designed as elongated holes aligned in the conveying direction in order to define a maximum angle of rotation.

The traction piece is shaped according to the cavity in the head part, so that it is guided and twistable in the head part. Normal to its axis of rotation, the traction piece has a bore which can accommodate the chain pin in a substantially positive manner and which is aligned with the openings of the head part, namely in particular the elongated holes. If the chain pin is inserted through the head part and the traction piece, the traction piece can only twist relative to the head part as far as the elongated hole allows. The length of the elongated hole determines the angle at which one chain link can twist against the next chain link in the plane of the support surface.

The cavity in the head part is preferably formed in a cylindrical manner, the traction piece can be designed as a solid or hollow cylinder.

In order to make it as easy as possible to change the carriers, i.e. by hand only, without tools, two advantageous methods of attachment are provided for the carriers: sliding them on without latching them with the means for fitting on the chain link and sliding them on with latching onto the means for fitting.

In both cases it is preferable that the fastening part is designed to slide on the means for fitting. In particular, it may be provided that retaining bars serving as guide rails are provided on the fastening part for the means for fitting.

In the case of sliding on without latching, the fastening part may have an actuating means for sliding on the means for fitting. This actuating means may be an extension or a pin, on which, during operation, a displacement means, such as a fixed guide element, such as a link, can engage and variably displace the fastening part transversely to the conveying direction. The carriers can be designed so that they can be fitted from the side, for example, but they do not lock in place but can slide transversely to the direction of conveying.

In case of a bolt, e.g. metal bolt, the actuating means can be fixed in the fastening part. However, the actuating means can also be made in one piece with the fastening part in the case of the extension and made of the same material as the fastening part, e.g. by injection molding.

The chain link, in particular its projection, can be toothed, even in the event of fastening without latching, and can be of the same design as a toothing between chain link and carrier, but the carriers are formed in a smooth manner. Each carrier can therefore slide within a certain range transversely to the conveying direction after being fitted to the chain link. In each carrier there is then a bolt, for example, which protrudes upwards. This bolt can now be guided by means of a groove in a guide (link) or cross limiter. By changing either the position of the whole link crosswise to the conveying direction, or by changing the position of the groove in the link, or both, the carrier can be moved transversely to the conveying direction within the limits specified on the chain link. This is advantageous because the distance between the gripping parts can be easily adjusted, e.g. for changing the type of closure. However, the construction of the chain conveyor is more complicated and elaborate; special displacement means such as guides or links are necessary.

In the case of sliding on with latching, the fastening part is designed to latch onto the means for fitting. For example, the carriers can be fitted from the side and fixed by latching in various transverse positions. The chain link, in particular the projection of the chain link, and the carriers are toothed and latch into each other when the chain is fitted. Different carrier heights can be realized by fitting carriers of different heights. Different width settings can be achieved by varying the width of the toothing across the conveying direction. The mutual toothing is simple in its configuration, but the distance between the gripping parts of the carriers is fixed by snapping on, and can only be changed again by snapping off and snapping on again in a different position. Depending on the length of the conveyor and the number of chain links, this sometimes requires a long changeover time.

The two variants with and without latching differ preferably only in the design of the carriers. The chain link itself can remain the same in both variants.

It may be provided that the gripping part has several finger-shaped or lobe-shaped extensions of elastic material for holding small parts. Finger-shaped or lobe-shaped means that the width of the fingers or lobes is approximately of the same order of magnitude as their spacing, but the spacing of the fingers or lobes can also be two to three times the width of the fingers or lobes. This means that they can also deform normally to their longitudinal extension, but still have enough stability not to buckle. For example, two to ten finger-shaped or lobe-shaped extensions may be provided, e.g. three, four, five or six finger-shaped or lobe-shaped extensions. The fewer extensions are provided, the more favorable this is for cleaning the gripping parts or chain links.

The fingers or lobes may be straight in their design. They can taper towards their free end to be more malleable where they engage with the small parts than at their base. The cross-section can remain the same, as seen in the height direction.

An embodiment of the invention is that the gripping part has or forms exactly one extension of elastic material for holding small parts, which extension is designed to contact a small part with at least one flat boundary surface in the fitted state of the carrier. The gripping part can be designed as a single jaw, e.g. with an essentially rectangular or triangular cross-section.

Another embodiment of the invention is that the gripping part has exactly one curved extension of elastic material for holding small parts, which extension is designed to at least partially enclose a small part with its curvature in the fitted state of the carrier.

The gripping part, whether with one or more extensions, should be smooth on its surface. If the gripping part is made of a foam material, its pores on the surface of the gripping part should be closed. It would also be conceivable that the gripping part is designed as an elastic hollow body, e.g. by a rubber part whose wall forms the extension or extensions. The surface of the gripping part should be as abrasion-resistant as possible.

If the gripping part is made of one piece, the fingers or lobes are joined together at their base and the risk of a finger or lobe coming loose is lower compared to fingers or lobes that are glued together. In particular, the individual finger or lobe can reach over the entire height of the gripping part. The finger or lobe can have the same cross-section over the entire height of the gripping part.

In order also to reduce the risk of the gripping part becoming detached from the fastening part, it may be provided that the fastening part and the gripping part are manufactured in one piece by a common manufacturing process, such as a two-component injection molding process.

Basically, however, the fastening part and the gripping part can also be fastened together by vulcanization, welding, gluing or mechanically.

One embodiment of the invention is that the carriers are pretensioned by spring elements towards the opposite carrier in the fitted state. Each carrier can be pretensioned by at least one individual spring element. A spring element is connected on one side to the carrier and on the other side to the chain link. The spring element can be a cylindrical spring in the form of a compression spring. The spring element is dimensioned in such a way that a small part is held by the two carriers solely by the spring elements, without the carriers latching to the chain link in this position. This has the advantage that actuating means (e.g. bolts or projections) arranged on the fastening part of the carrier only need to be actuated by corresponding displacement means, such as links, when inserting and removing the small parts. This is because the carriers have to be removed from each other against the spring force.

A preferred embodiment consists of two carriers are snapped onto one chain link each, one on the left, one on the right, both sliding, and each is pressed towards the middle of the chain with a small spring. A metal pin is fastened in a protruding manner at the top of the carrier, as before, or a directly injection-molded, upward protruding pin made of the same material as the fastening part. At the beginning of the conveyor line, a control link can be used to push the spring loaded carriers apart so far that the small parts, such as closures, can be fed by being pushed over between the carriers from above or horizontally and at the end of the link they are gently clamped by the spring pressure and the elastically resilient extensions. The reverse is then carried out at the end of the conveyor line when the small parts, such as closures, are transferred to a downstream trough or conveyor, preferably by horizontal discharge. The horizontal pushing over and discharge is preferably carried by means of inclined air nozzles integrated in these units (pushing with sterile air).

The invention also comprises a conveyor chain with several consecutive chain links according to the invention.

The chain links can be designed in such a way that on the side of the chain link facing away from the support surface there is at least one head part and a fork part with two legs opposite the head part in the conveying direction, wherein the fork part is designed in such a way that the head part of a chain link can be inserted between the legs of the fork part of a following chain link. In the conveyor chain, one head part of each chain link is then connected to the fork part of the following chain link by means of a chain pin.

For the chain links it may be additionally provided that the head part has a cavity for receiving a traction piece which can be rotated in the cavity, wherein the design of the cavity defines an axis of rotation of the traction piece normal to the conveying direction of the chain link, in particular normal to the support surface, and wherein the openings in the head part are designed as elongated holes aligned in the conveying direction in order to define a maximum angle of rotation. Correspondingly, each chain link is provided with a traction piece which is guided and twisted in the head part, wherein a chain pin is located in the bore of the traction piece.

The chain pins are inserted or pressed into the openings, such as bores, of the chain link and the traction piece from the side. Afterwards they form a permanent connection. In order to ensure this and to prevent unintentional migration of the pin during scheduled operation, the pin is preferably provided with a knurling at a point which is pressed into the bore of the chain link, which in addition to the non-positive connection by means of plastic deformation (pressing into the chain link when pressed in) produces a positive connection.

The chain links, preferably made of plastic, are connected to each other by a chain pin, preferably made of metal, such as stainless steel, and by an additionally inserted, so-called traction piece. Together these parts form an endless circulating chain strand, the conveyor chain.

Carriers can be fitted onto this conveyor chain, in particular snapped onto it. Each chain link preferably carries two carriers of preferably the same type (same height, width, softness, smooth or toothed, . . . ) selected according to the requirements of the material to be conveyed and optimally adapted to it.

The material to be conveyed, mainly small parts made of plastic or metal (aluminum) such as bottle closures, can lids or tins, caps or overcaps, is usually conveyed by two mechanisms. On the one hand resting on the conveyor chain by friction, just like on a normal conveyor belt. On the other hand, if necessary, it is additionally clamped laterally from both sides gently or, depending on the requirements, more or less strongly by carriers attached to the chain link or by the gripping parts integrated into these carriers.

The invention also relates to a chain conveyor with a conveyor chain according to the invention and a drive for this conveyor chain. The drive can be designed in different ways.

Either the conveyor chain runs at both ends of the conveyor, i.e. at the ends of the conveyor or it runs over drive and/or deflection wheels. Preferably, the conveying chain piece (strand) is located on the upper side and the returning chain piece on the lower side.

Preferably, a head drive station with a toothed drive wheel is used and at the opposite other end a deflection pulley, preferably smooth, or also toothed, but always rotating. Alternatively, the pulleys at both ends can be toothed and driven. Such a double drive can be used for very long conveying distances. Alternatively, a so-called omega drive station can be used at any position of the returning chain piece (strand). In this case, only deflection wheels are used at the head and foot end, i.e. at the ends of the conveyor line.

For the chain conveyor, it may be provided that chain guide profiles are provided at least in sections on both sides of the conveyor chain parallel to the conveying direction, on which the conveyor chain rests with its means for fitting at least one carrier.

The conveyor chain is therefore guided by two chain guide profiles made of low-friction and wear-resistant plastic, which are attached on both sides (1× left-hand side and 1× right-hand side of the conveyor chain). Ultra-high molecular weight low-pressure polyethylene (UHMWPE) with special additives that further reduce friction (LF addition, low friction) is preferred. These chain guide profiles are arranged in the same way on each side, as seen in height direction preferably between the projection and the bore stub carrying the bore for the chain pin, which is provided on the outside of the leg of the fork section, and limit the position of the conveyor chain with slight play in both coordinates transverse to the conveying direction. The left and the right chain guide profile preferably have the same geometry and can be selectively fitted or pushed onto the body (support frame) of the chain conveyor in a simple manner.

If the chain links of the conveyor chain have carriers and their fastening part has an actuating means for displacement on the means for fitting, then displacement means, in particular links fixed relative to the conveyor chain, can be provided on the chain conveyor, with which the actuating means for displacing the carriers can be contacted along the means for fitting. The displacement means, such as links, engage the actuating means, such as extensions or bolts, of the carrier and displace the carriers transversely, especially normally, to the conveying direction, inwards (for small parts with a smaller diameter) or outwards (for small parts with a larger diameter). The carriers on both sides of the conveyor chain can be moved, especially to the same extent, or only the carriers on one side of the conveyor chain. In the same way, the clamping pressure can also be varied for small parts with the same diameter by moving the displacement means.

If the carriers are pretensioned by spring elements towards the opposite carrier in the fitted state, these displacement means are only provided in the sections of the chain conveyor for inserting and removing the small parts. This is because the carriers have to be moved apart against the spring force in order to insert or remove the small parts. For the remaining sections of the chain conveyor, the small parts are held by the pretensioned carriers.

The displacement means, such as links, are preferably self-adjusting. It may be provided that the displacement means can be adjusted transversely to the conveying direction in order to be able to set a predetermined distance between two opposite carriers of a chain link.

In addition or alternatively, it may be provided that the distance between the conveyor chain and the displacement means is adjustable to ensure that the displacement means engages with carriers of different heights. In other words, there is an adjustability of the displacement means in the height direction of the chain links.

The chain link, as well as the traction piece and carrier are designed in such a way that after connection to the conveyor chain, it is not only possible for this conveyor chain to run in a straight line in one plane (conveyor plane), but also to run through curves of any angular degree in this conveyor plane. The only limitation is the minimum radius that can be passed through, as otherwise there is contact on the inside of the projections of successive chain links and/or other elements such as the carrier. In order to improve this, the projections of the carriers can be beveled at the non-functional ends, i.e. at the protrusion which may project laterally beyond the carriers.

For large curve radii, the curve path is created by the corresponding run of the chain guide profiles guiding the chain. In the case of tighter curve radii, preferably radii smaller than approx. 350 mm, the inner guide track, i.e. approximately the corresponding chain guide profile, can be replaced by a guide disc (cam disc) made of hard and wear-resistant plastic, e.g. polyoxymethylene (POM) or PA, which guides the chain and can rotate about an axis of rotation orthogonal to the conveying plane. This leads to less frictional resistance. As an alternative to a large cam disc, many small rollers can be used.

In addition, the chain link and optionally the traction piece and the carrier are preferably designed in such a way that after connection to the conveyor chain, the conveyor chain can run not only in one plane (conveyor plane, but also out of this plane in an arc shape. Outer bends, where the carriers are on the outside, can also be created here for large radii by appropriate running of the chain guide profiles guiding the chain. For tighter curve radii, e.g. smaller than approx. 200 mm, rotatable guide discs (curve discs) are also used here, or deflection discs like those at the foot end of the chain conveyor (if the conveyor is only driven at the head end).

Inner bends, where the carriers are on the inside, are also possible in principle in any radius, but limited downwards by the mutual contact of the carriers and by any deflection discs required for the returning strand. To improve this, the outer surfaces of the carriers perpendicular to the conveying direction can be formed in a beveled manner so that they become narrower with increasing height away from the support surface in the assembled state.

One embodiment variant of the chain conveyor provides that the returning strand of the conveyor chain is equipped with a cleaning device, which can be switched on automatically in particular. This has, for example, means for spraying the conveyor chain with cleaning agent, one or more rotating brushes, and/or means for (subsequent) hot air drying. In addition or alternatively, the returning strand can be equipped with an automatic disinfection unit, for example with means for spraying the conveyor chain with disinfectant and optionally with a subsequent drying process.

The invention makes it possible to provide a conveyor chain with carriers that can be fitted without tools and are available in different heights.

The chain link itself, i.e. the support surface and the means for fitting the carriers, and optionally the head part and the fork part, is preferably made in one piece, in particular from one part, for example by injection molding.

Accordingly, the chain link is preferably made of plastic, due to its low weight and good friction properties, with very good sliding properties (low friction, high wear resistance). Optionally, this plastic can also be made antistatic to prevent dust and abrasion from being attracted. And/or an antibacterial effect can also be achieved by adding additives during the manufacturing process. Polyoxymethylene (POM) is preferably used as the base material. Alternatively, polyamide (PA) could be used, or similar plastics with similar properties.

For hygienic reasons, the surface of the chain link is designed as smooth as possible and without recesses.

The chain link with carriers according to the invention ensures a positive but resilient conveying of the small parts. The small parts can be container closures, e.g. closures of jam or cucumber jars, but especially bottle closures made of metal or plastic, such as crown caps or screw caps. If the force on the projections would be too great, they would give way in order not to damage the closure.

The carriers primarily grip the small parts with a positive fit, but still with spring action. This means that the conveyors do not primarily grip the small parts in a non-positive manner, both of which prevent damage to the small parts when they are conveyed. The elasticity of the extensions of the gripping part of the carriers can be adapted to the small parts to be conveyed, if necessary. The elasticity can be adjusted, for example, by selecting the Shore hardness of the gripping part or by shaping it.

Rubber-like plastics can be used for the gripping part with its extensions, preferably thermoplastic elastomers (TPE), e.g. so-called TPE-U (often also abbreviated TPU) based on urethane, or so-called TPE-S (often abbreviated TPS) based on styrene (styrene block copolymers), or thermoplastic vulcanizates or cross-linked thermoplastic elastomers called TPE-V (often abbreviated TPV), e.g. based on olefin, or so-called TPE-O (olefin-based). Depending on the application, other such plastics are used, depending on how soft the extensions have to be, how abrasive the material to be conveyed is and how high the ambient temperatures are.

The Shore hardness usually varies between approx. 45 Shore-A and 70 Shore-A depending on the plastic used. It is important that the extensions, i.e. the fingers, are elastic, but also spring back permanently and retain their shape in the long term.

The fastening part, i.e. the harder part of the carrier, must bond well with the soft part, i.e. the gripping part, if the carrier is manufactured in one piece. Preferably, polyamide (PA) or POM or acrylonitrile-butadiene-styrene copolymer (ABS) or similar is used for the fastening part. As a rule, the hardness of the mounting part is in the range of approx. 80-85 Shore D.

Having only one circulating conveyor chain instead of two conveyor belts is a major advantage with regard to the complexity of the chain conveyor. With the conveyor chain according to the invention, not only straight conveyor sections—horizontal, vertical or inclined—can be realized, but also bends, i.e. a curved path out of a conveying plane, and curves, i.e. a curved path in a conveying plane. Straight sections, bends and curves can be combined as required.

With the chain conveyor according to the invention, vertical and/or horizontal changes of direction can be carried out, whereas in systems according to the prior art, different conveyors in a row are necessary for this purpose, so that in such a row of conveyors, the transfer of small parts between the conveyors can be susceptible to faults.

The fact that the extensions of the gripping parts in the present invention are not applied as separate parts to the rest of the gripping part (welded on or inserted in holes or glued on), but the entire soft component is manufactured in one piece, means that these extensions are less likely to tear out or fail.

With the gripping parts according to the invention, it is easier to set a suitable contact pressure for closures than with two circulating flat belts according to the prior art, since the extensions of the gripping parts are designed in a resilient manner.

BRIEF DESCRIPTION OF THE FIGURES

The invention is now explained in more detail by means of embodiment examples. The drawings are exemplary and are intended to illustrate the idea according to the invention, but in no way restrict or even conclusively represent it, wherein.

DETAILED DESCRIPTION OF THE PREFERRED EMBODIMENTS

Figure 1:
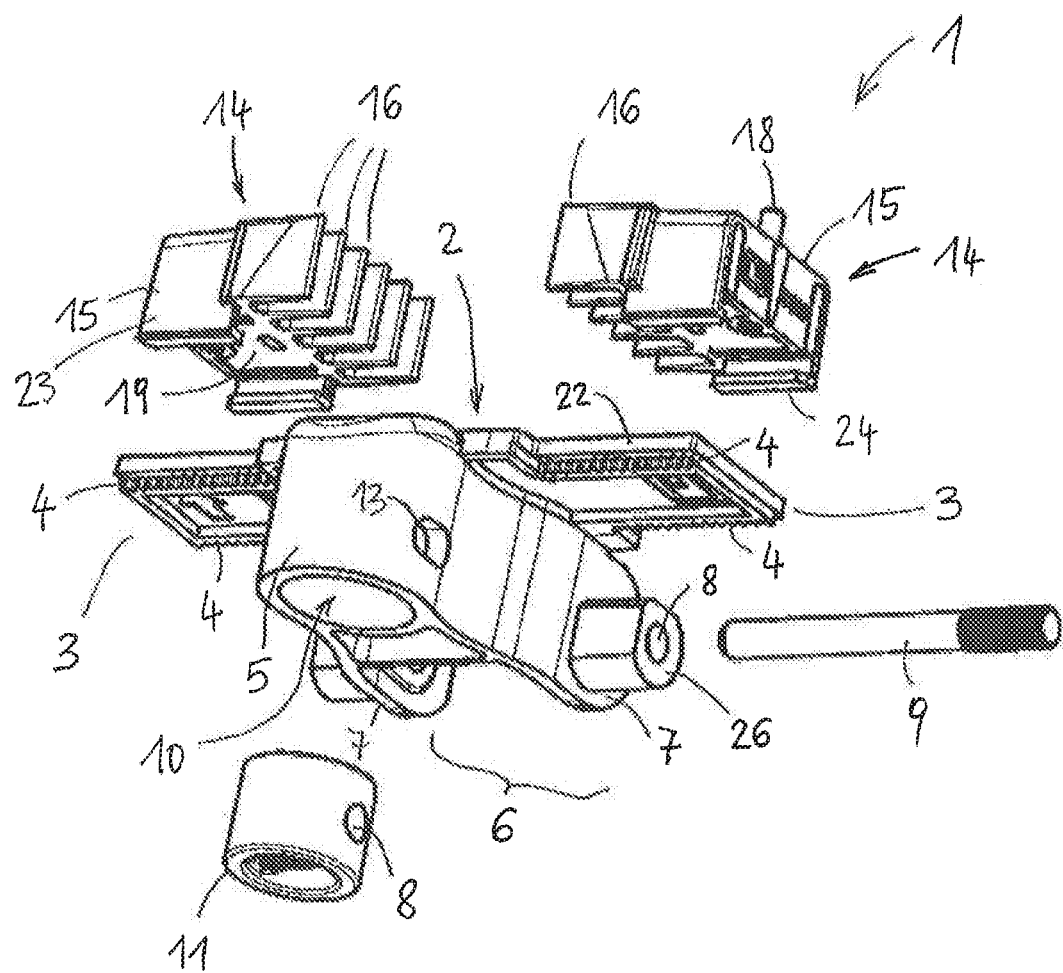
FIG. 1 shows an exploded view of a chain link from the front and below.

FIGS. 1 to 4 show a chain link 1 according to the invention. Each chain link 1 has three openings 8 for the chain pin 9, especially in the form of bores. An elongated hole 13 in the narrower head part 5, and two holes in the fork section 6, which are in alignment as good as possible, here one in each leg 7 of the fork section 6. In the head part 5, where there is an opening in the form of an elongated hole 13, the chain link 1 has a cavity 10 on the underside to accommodate the traction piece 11.

In the central area, chain link 1 has two wing-like projections 3 on the upper side, one each orthogonally projecting to the left and to the right as seen in conveying direction 12. The upper side of the projections 3 lies here in the same plane as the support surface 2, the upper side of the projections 3 and the support surface 2 form the conveying plane. These projections 3 serve on the one hand to be able to fit a sliding guide under these projections 3, which can form a guide across the width of the projections 3, can support the entire projection 3 downwards in each case and can carry the weight of the conveyor chain formed by the chain links 1 together with the material being conveyed. This sliding guide can be formed by chain guide profiles 20, see FIG. 8. On the other hand, these projections 3 are used for fastening and accommodating carriers 14, which can be designed in different ways. By means of a latching portion, such as a toothing 4, they allow carriers 14, which can also be designed in a toothed manner, to be fitted (snapped on) in different positions but fixed in position after fitting. However, the toothing 4 or the snap-on area does not extend to the outside end of the projection 3 but ends just before it. Also, the toothing 4 ends shortly before the central body area of the chain link 1, i.e. shortly before the support surface 2 for the small parts. Toothing 4 is provided on both mutually parallel flanks of each projection 3, both on the flank oriented in the conveying direction and the flank oriented against the conveying direction. The toothing 4 is located on both flanks and extends in the height direction preferably from the center of the flank to the underside of the projection 3.

From the center of the flank to the top side, the latching portion is surmounted by an untoothed protrusion 22 which engages in a retaining bar 24 on the fastening part 15 of the carrier 14 which serves as a guide rail.

Ribbing can reinforce chain link 1 to absorb all forces.

The traction piece 11, which is inserted from below into the front part of chain link 1, i.e. the head part 5, serves on the one hand as a joint to ensure changes in the direction of movement of chain link 1 in the horizontal plane, and on the other hand for an almost play-free connection of individual chain links 1 via the fork part 6 and the chain pin 9 to the following chain link 1 and in this form for the optimum introduction of the forces occurring during the movement of the conveyor chain from the preceding chain link 1 to the following one. The minimum radius in which the traction piece 11 allows a change of direction is defined by the geometry of the chain link 1 and the attached carriers 14.

Traction piece 11 can be made of the same material as chain links 1, or it can be made of a different material but with very similar other properties to reduce friction and noise. Polyamide (PA) is preferably used for the traction piece 11, alternatively POM or other plastics with similarly good strength properties could be used.

If required, any type of carrier 14 can be attached to the chain links 1, in particular snapped onto them. There is a need if a lateral guide is necessary for the material to be conveyed. The advantage of fitted carriers 14 as guides is that they travel with the material to be conveyed, and thus there is no relative movement between the material to be conveyed and the lateral guide, as is the case with other, fixed guides. No relative movement means no friction, no rubbing, no abrasion, no "angel hair" as with air conveyors. However, there may also be a need if the conveying direction 12 deviates from the horizontal and firstly the frictional force transmitted on the support surface 2 is no longer sufficient to move the material to be conveyed further, or secondly the material to be conveyed would even tip or fall off the conveying surface due to gravity. In this case, the carriers 14 provide additional propulsion and prevent the material being conveyed from tipping or coming loose from chain link 1 by clamping.

It is intended that preferably always two carriers 14 are fitted to each individual chain link 1. To be more precise, one carrier 14 is fitted to each of the two projections 3 of chain link 1, one carrier 14 to the area provided on the left-hand projection 3 and one to the area provided on the right-hand projection 3.

The fitting (snap-on) is preferably done from the side, the snap-on direction is therefore especially normal to the conveying direction. The fitting (snap-on) is preferably achieved by elastic expansion or elastic spreading of preferably two narrow fastening lugs (legs) 23 provided on the carrier 14, in particular on the fastening part 15, the end of which carries a retaining bar 24 for clamping (enclosing) on the projection 3. The fitting and snap-on is carried out manually by hand, no tools are required. Likewise, carriers 14 that have already been snapped on can be dismantled again non-destructively by hand, by pushing and pulling and thus stretching the fastening lugs 23. This also enables the changing of different carriers 14 when using different materials to be conveyed.

When snapped on, the two fastening lugs (legs) 23 of the carrier 14 rest resiliently with slight pressure against the flanks of the projection 3 of the chain link 1, or against the toothless protrusion 22 which forms the guide. The retaining bar 24 of the carrier 14 engages under the protrusion 22 and contacts the flank of the projection 3 exactly in the area of its toothing (latching portion) 4.

The flank of the retaining bar 24 in this contact area can be designed in two different ways, either smooth (without toothing) or toothed. If it is toothed, which is not shown here, the teeth of the two parts (of the retaining bar 24 of the fastening part 15 and the projection 3) engage with each other and cause the snapped-on carrier 14 to be transversely adjustable only with greater force or not at all (depending on the spring force of the retaining bar 24 or the fastening lugs 23). If it is without teeth (smooth), as in FIGS. 1-3, the snapped-on carrier 14 is well guided and can be moved relatively easily in the transverse direction.

All carriers 14 are of the same design and can be mounted in the same way selectively on either the left or right projection 3 due to their symmetrical design.

Following the principles of "Hygienic Design", all surfaces on the carrier 14 are designed to be as smooth as possible and without cavities (hollows). Likewise, all surfaces are beveled as far as possible so that liquids do not stop but run off.

Preferably, the carriers 14 consist of two components, i.e. a soft component, here the gripping part 19, which is designed to be soft and elastically deformable and forms gripping elements in the form of extensions 16, such as thin fingers or lobes. The material to be conveyed is gently and carefully clamped with light pressure. The pressure exerted on the sometimes very sensitive material being conveyed should be as low as possible.

This can be influenced and varied in a beneficial manner by the length of the fingers, their width, thickness, type, shape and form and, above all, by the softness or flexibility of the material used (preferably thermoplastics, rubber or similar with the additional properties of smooth and abrasion-resistant). Additives added during the manufacturing process can also help to achieve properties such as antistatic or antibacterial.

The second component of the carrier 14 is a hard component, which holds the soft component, and both are firmly (relatively rigidly) attached to the likewise relatively rigid conveyor chain, providing sufficient support and enabling functions such as push-on or snap-on and transverse adjustment. Plastics such as POM, PA, ABS, PP or similar suitable materials are used here. Additives can help to achieve properties such as antistatic or antibacterial. The second component is realized by the fastening part 15.

The two components of the carrier 14, i.e. the fastening part 15 and the gripping part 19, can either be manufactured separately and then joined (connected) together. Or both components can also be produced inseparably combined by combined manufacturing processes (e.g. by means of a 2-component injection molding process).

The pressure exerted by two carriers 14 on the material clamped between them can also be significantly influenced by their position transverse to the conveying direction, as already described.

Figure 2:
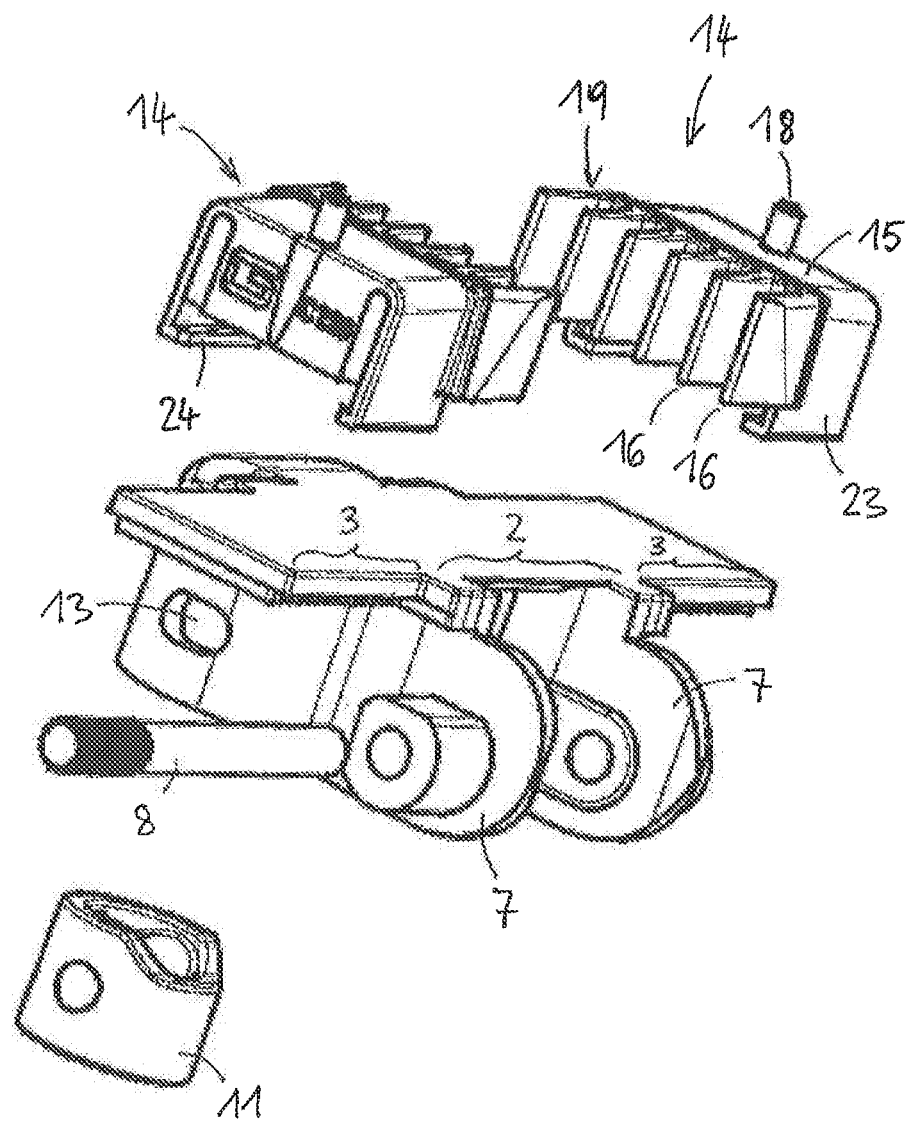
FIG. 2 shows an exploded view of a chain link from the side and above.
Figure 3:
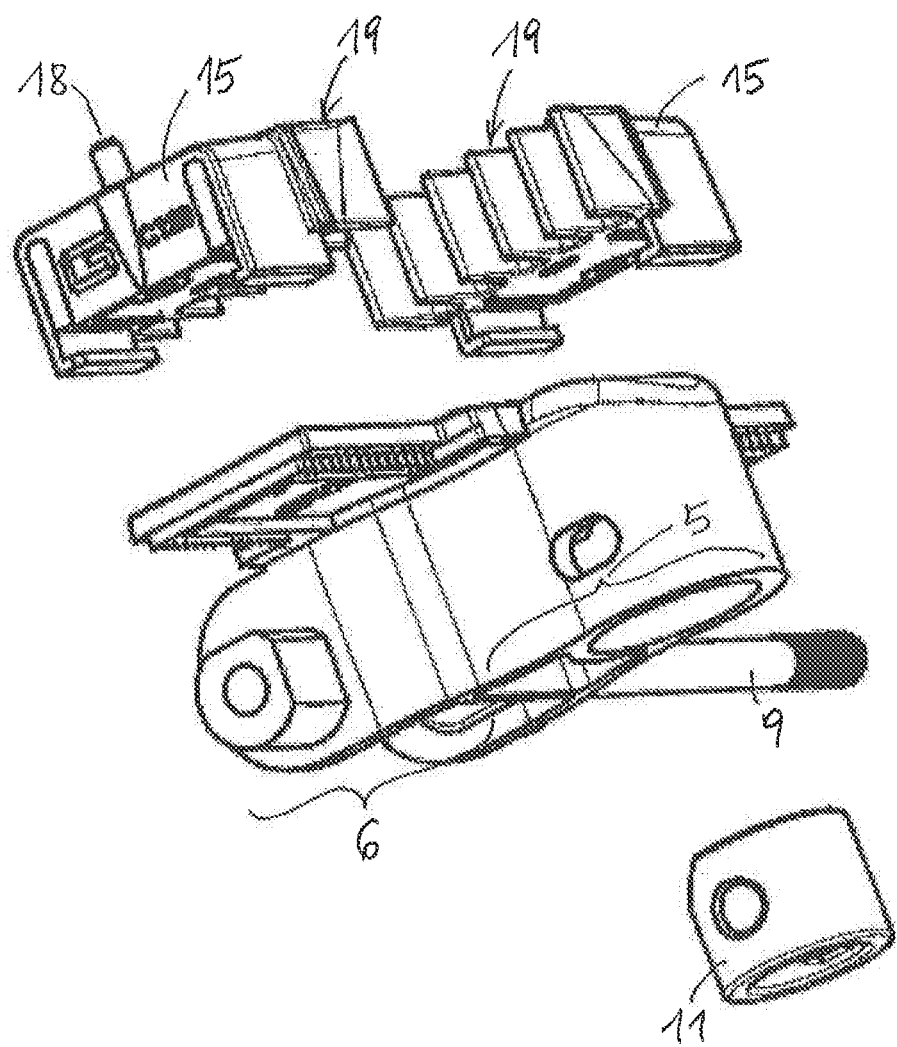
FIG. 3 shows an exploded view of a chain link from the side and below.
Figure 4:
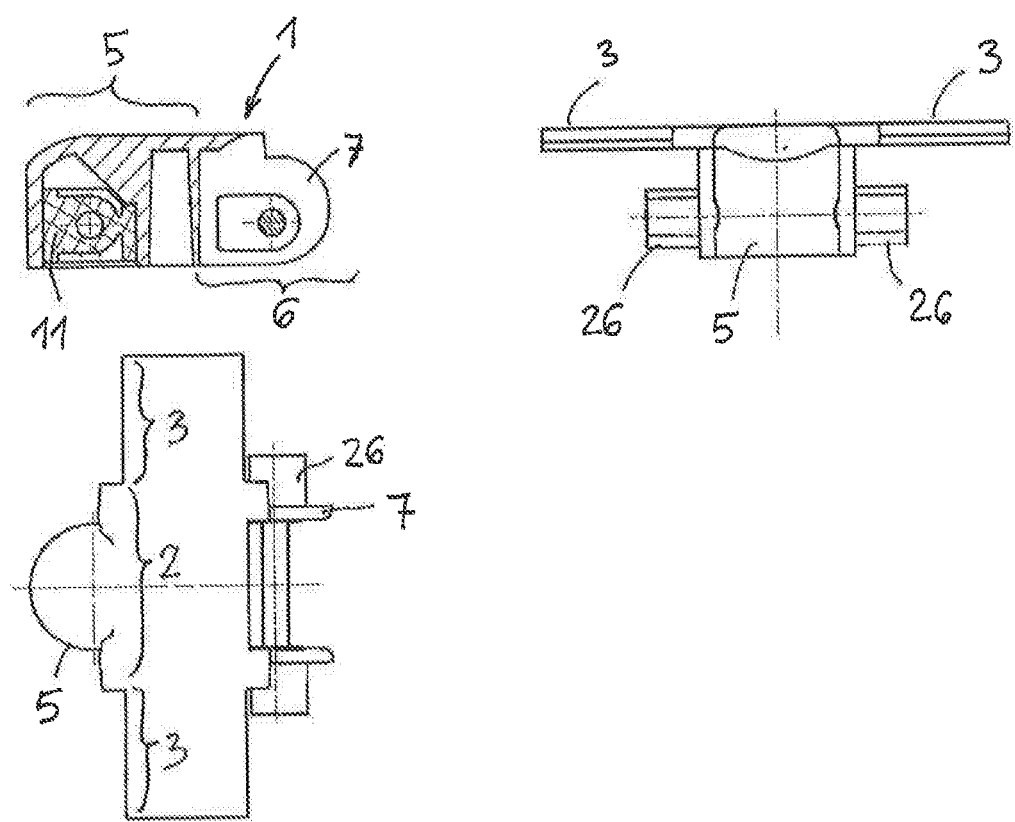
FIG. 4 shows a longitudinal section, front view and top view for a chain link according to FIGS. 1-3.

FIG. 4 shows a longitudinal section, front view and top view for a chain link as shown in FIGS. 1-3. In the longitudinal section, the traction piece 11 can be seen in the head part 5. In the top view, it can be seen that the support surface 2 and the top of the two projections 3 form one plane.

Figure 5:
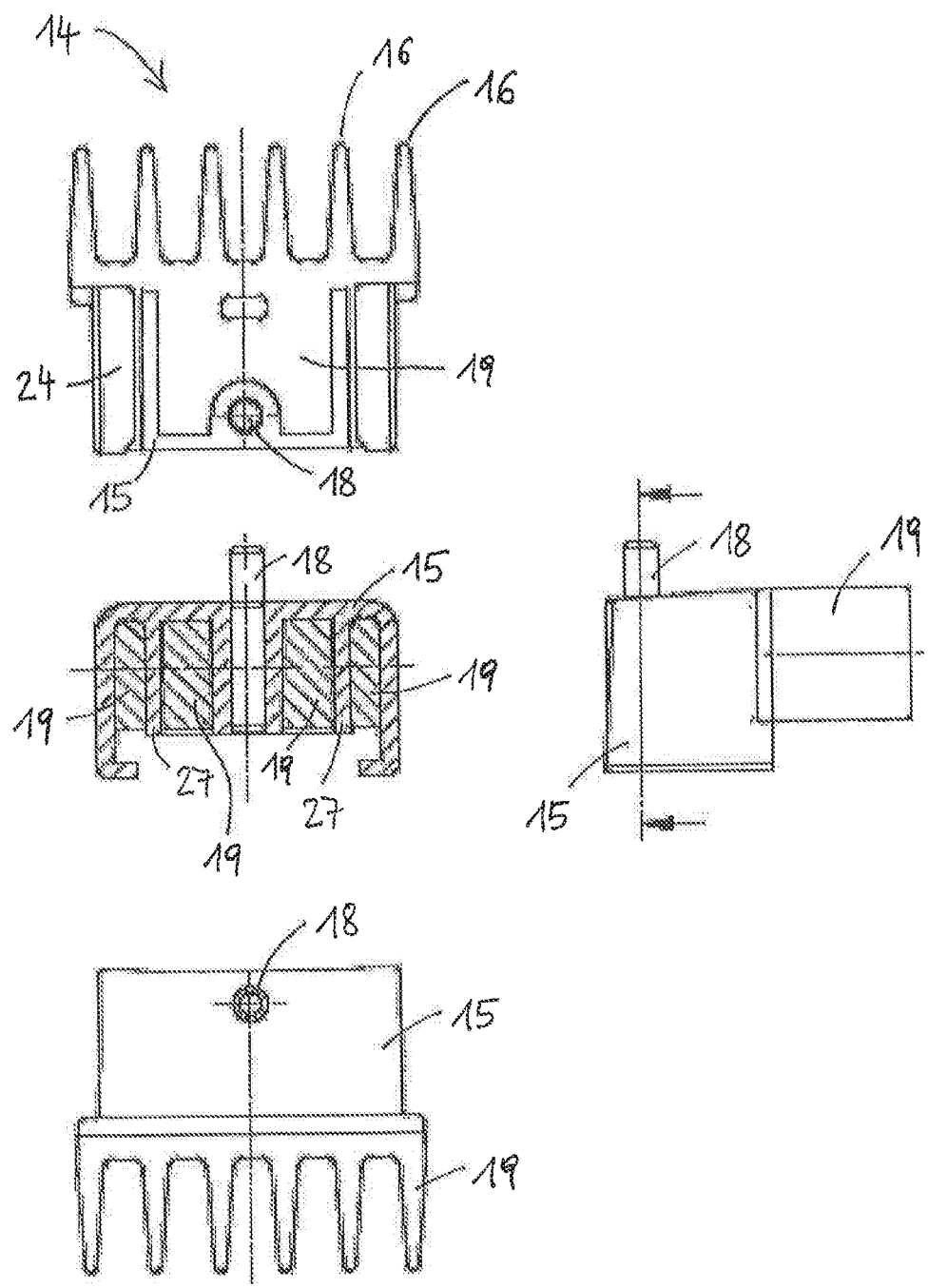
FIG. 5 shows a bottom view, cross-section in conveying direction, front view and top view of a carrier.

In FIG. 5 the two parts of the carrier 14 are clearly visible. Above in FIG. 5 the bottom view is shown from which the shape of the individual extensions 16 of the gripping part 19 can be seen. In the direction of the extensions 16, i.e. in the assembled state transversely, in particular normally, to the conveying direction 12, the gripping part 19 overlaps with the fastening part 15, where the gripping part 19 completely fills the fastening part 15, leaving of course the retaining bars 24 free. This ensures that these two parts are well connected. This can also be seen in the cross-section shown below. Here, the fastening part 15 still has ribs 27 on the inside, which are aligned parallel to the fastening lugs 23, which also serves as a connection between gripping part 19 and fastening part 15. The receptacle for the actuating part 18, designed as a pin, also penetrates the gripping part 19. In the top view of the carrier 14 in FIG. 5 below, it can be recognized that the gripping part 19 is wider than the fastening part 15 outside the fastening part 15 along the conveying direction 12. This means that the gripping parts 19, or their extensions 16, can form a continuous guide for the small parts 17 in conveying direction 12, while there is sufficient distance between the fastening parts 15 of consecutive chain links 1 to allow them to pass through bends or curves.

Figure 6:
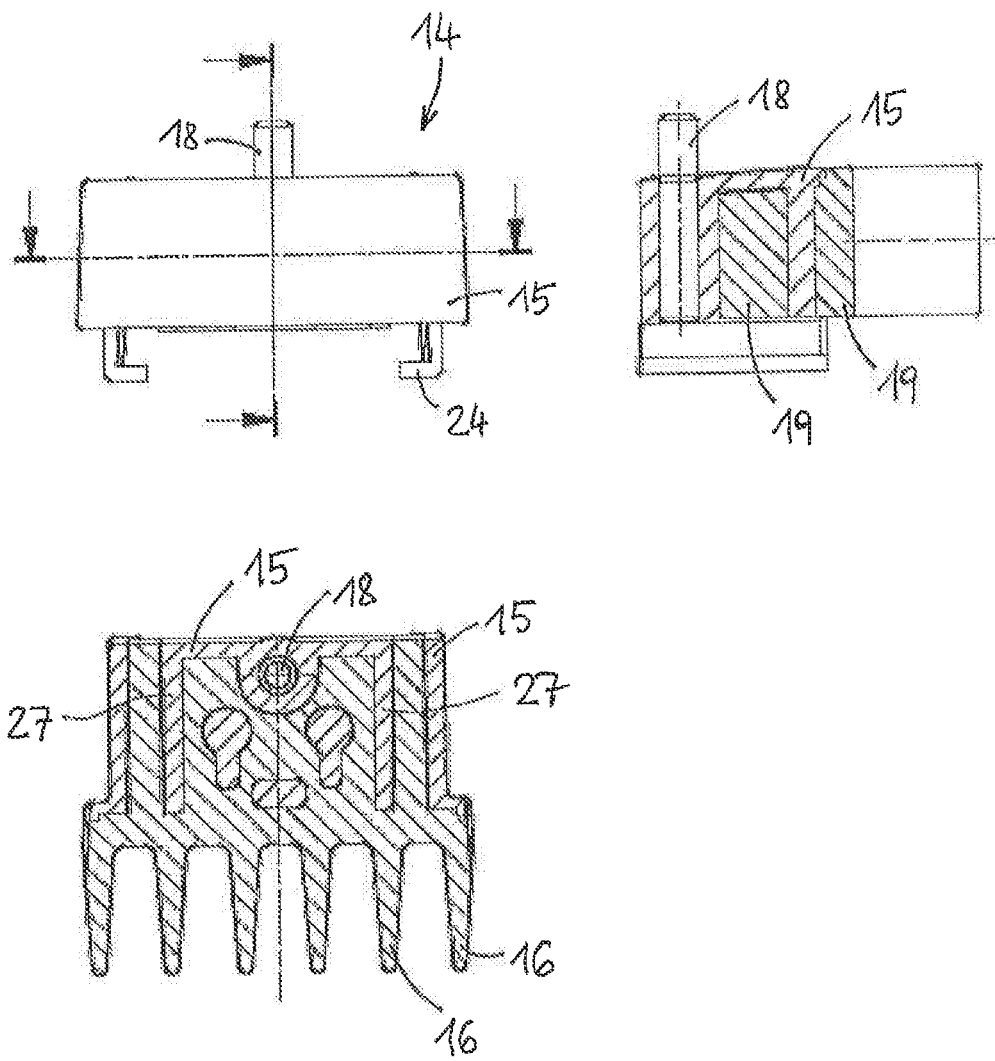
FIG. 6 shows a side view, cross-section normal to the conveying direction and cross-section parallel to the conveying plane of a carrier.

FIG. 6 shows the side view, a cross-section normal to the conveying direction and a cross-section parallel to the conveying plane of a carrier 14 according to the invention, as shown in FIGS. 1-3 and 5. The sections in FIG. 6 also show that gripping part 19 and fastening part 15 engage with each other positively. The gripping part 19 fills the spaces between the side walls of the fastening part 15, the fastening lugs 23, and the ribs 27 of the fastening part 15, as well as the space between the ribs 27.

Figure 7:
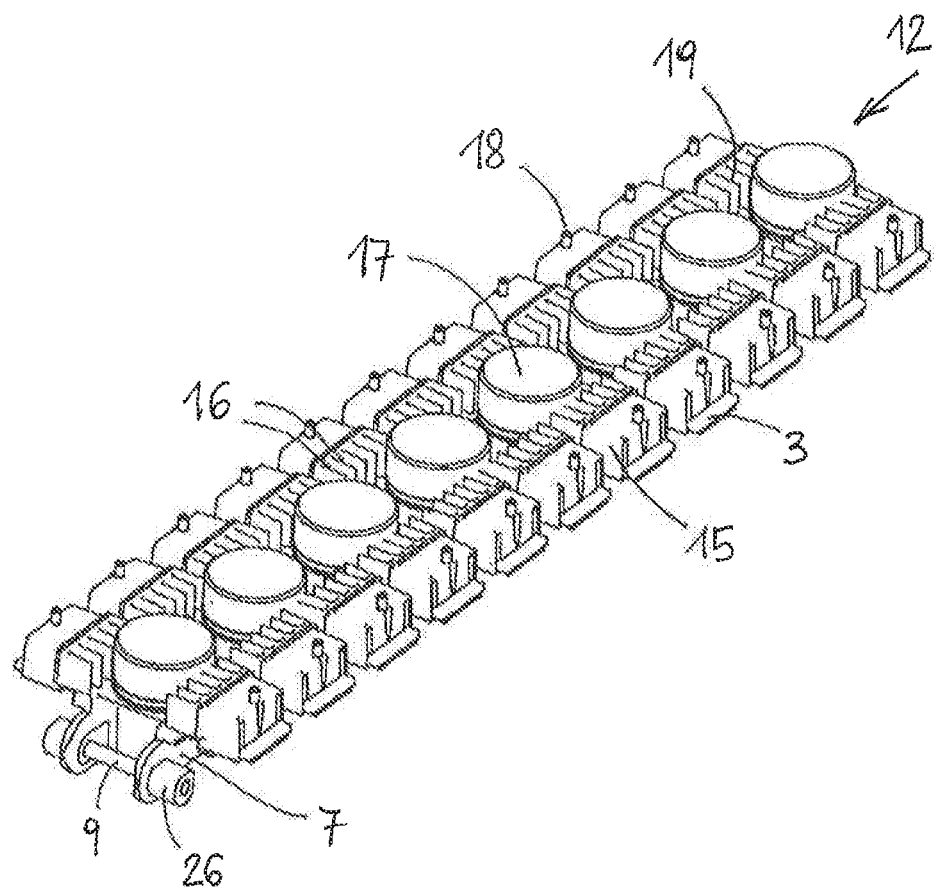
FIG. 7 shows a conveyor chain with closures in perspective.

FIG. 7 shows a perspective view of a conveyor chain on which small parts 17 are located in the form of bottle closures.

Figure 8:
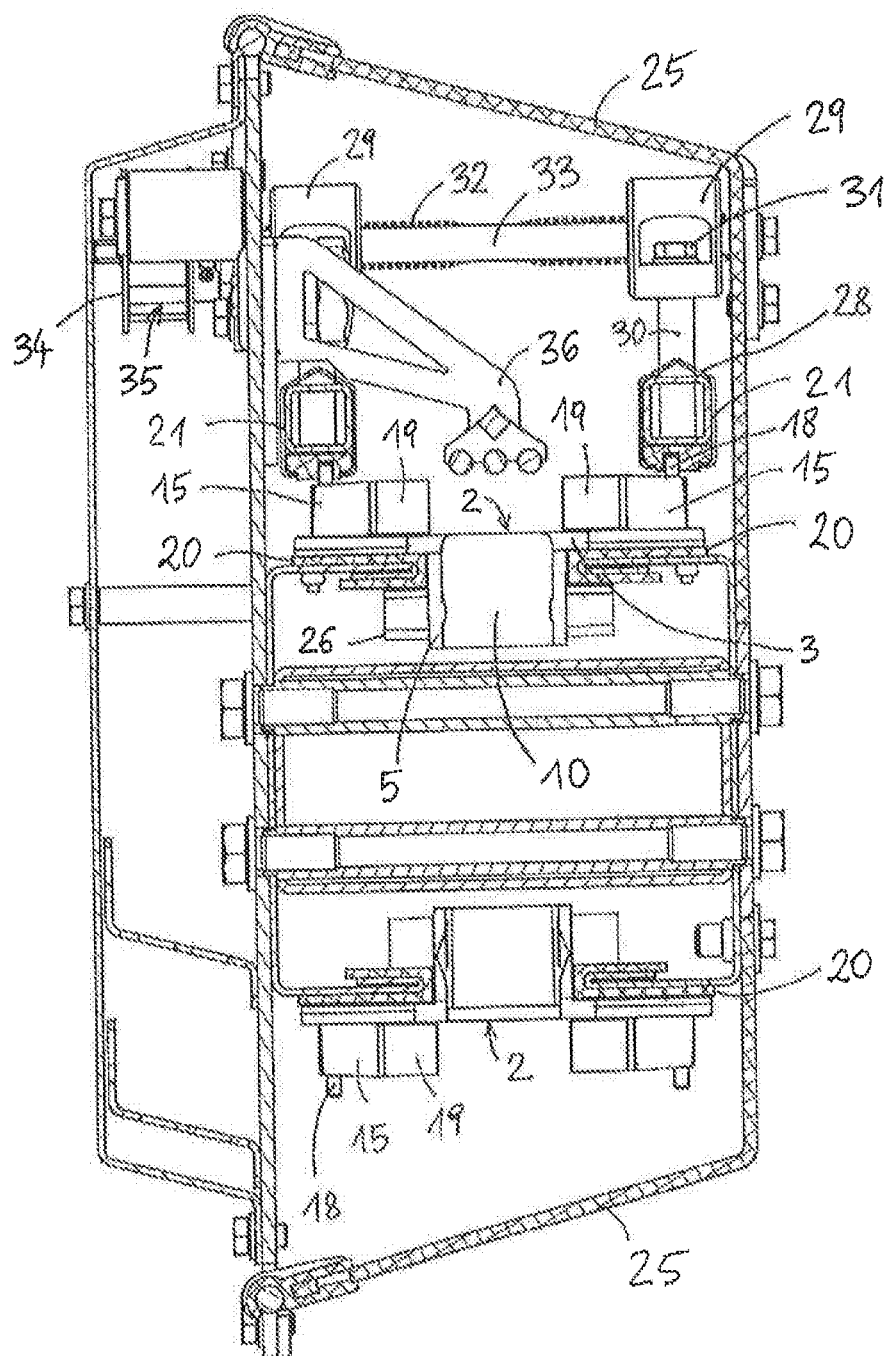
FIG. 8 shows a cross-section through a chain conveyor.

FIG. 8 shows a cross-section of a chain conveyor, which is constructed from chain links 1 according to the invention. The conveying chain piece (strand) is at the top and the returning chain piece (strand) at the bottom. Chain guide profiles 20 are provided on both sides of the conveyor chain parallel to the conveying direction, on which the conveyor chain rests with its projections 3.

These chain guide profiles 20 are arranged in the same way on each side—as seen in the height direction—between the projection 3 and the bore stub 26 carrying the opening (bore) 8 for the chain pin 9, which is provided on the outside of the leg 7 of the fork part 6, and limit the position of the conveyor chain with slight play in both coordinates transverse to the conveying direction 12. The left and right chain guide profiles 20 have the same geometry and can be easily fitted or pushed onto the body (supporting frame) of the chain conveyor as required.

The carriers 14 have an actuating means 18 in the form of a bolt for shifting on the upper side of their fastening part 15. Accordingly, displacement means 21 are provided on the chain conveyor, in particular displacement means that are fixed relative to the conveyor chain, i.e. links in this case. These have a groove in which the actuating means 18 are guided and are moved inwards towards the support surface 2 or outwards away from the support surface 2 according to the course of the groove. In the case shown, the carriers 14 on both sides of the conveyor chain are displaced to the same extent.

The groove that guides the actuating means (the bolt) 18 is milled into a plastic profile (preferably UHMWPE), or the profile is extruded in this form in the case of series production. The plastic profile has small dimensions in cross-section, but along the conveying direction 12 it extends along the entire conveying path. In order to allow thermal expansion at such lengths different from that of the metal conveyor body, it is guided longitudinally in a metal cage 28, e.g. made of stainless steel, and has small gaps at intervals along the conveying direction 12, which allow expansion without creating stresses (deformations). The gaps are, of course, only wide enough to prevent the actuating means (the bolt) 18 from getting stuck in them. The metal cage 28 also provides better stiffness and allows larger fastening distances.

The cage 28 with the guide link is now attached to adjustment elements 29 at intervals of approx. 1-2 meters towards the top. Preferably, the fastening is carried out by means of spacer elements 30, such as spacer sleeves, or otherwise height-adjustable, so that carriers 14 of different heights can be used. The spacer element 30 is fastened by means of a screw 31.

In this way, the left and right cages 28 (link) are mounted on trapezoidal threaded nuts with different thread directions (1× left-hand thread, 1× right-hand thread, preferably always trapezoidal thread). These trapezoidal threaded nuts are seated on a centrally arranged trapezoidal threaded spindle 32 with a different direction of thread away from the center (one side left-hand thread, one right-hand thread), and on at least one, preferably two additional guide elements 33 in the form of e.g. a round steel bar (longitudinal axis), which prevent the trapezoidal threaded nut from rotating with the trapezoidal threaded spindle 32 and ensure good guidance and that no bending force and no moment is introduced into the links or cages 28.

Figure 9:
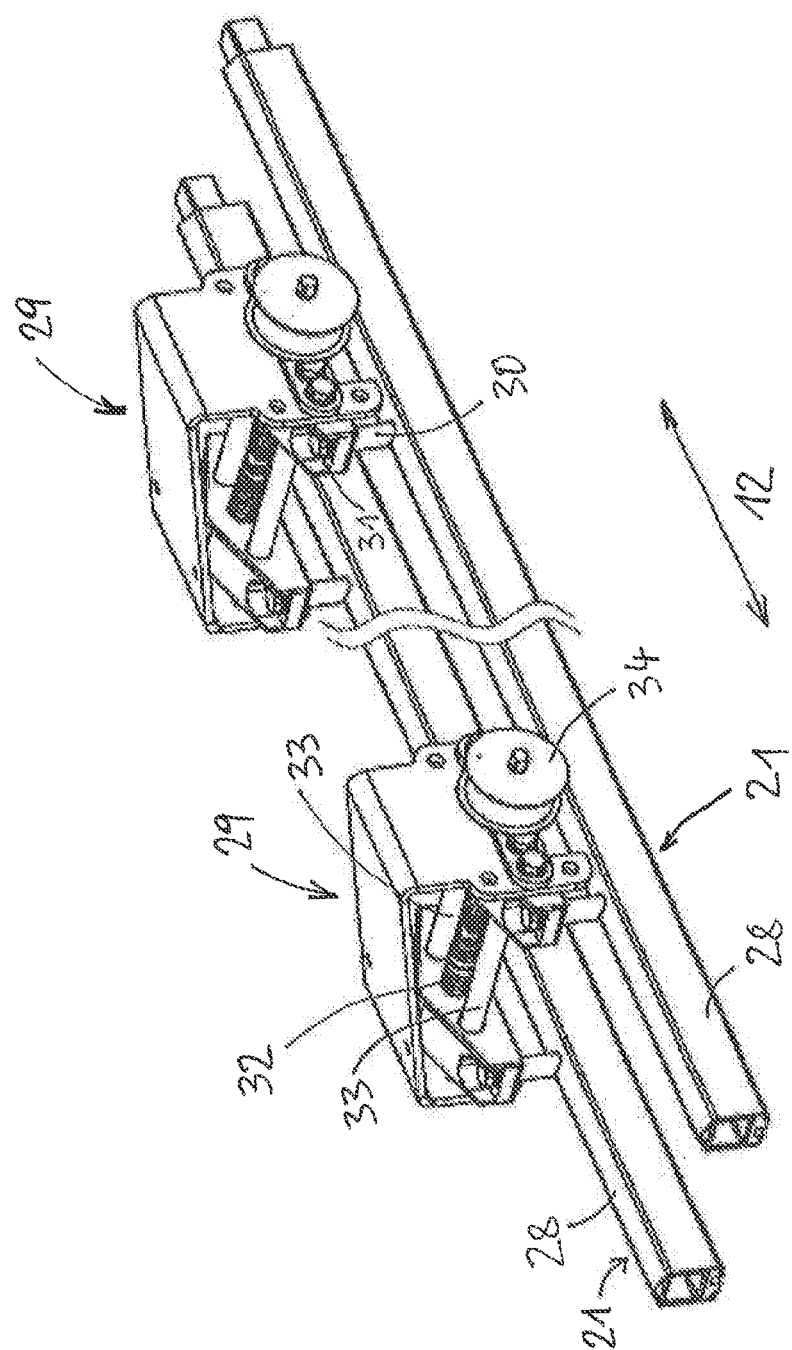
FIG. 9 shows a displacement means (link) with adjusting element of a chain conveyor in perspective view.

This can be seen better in FIG. 9. By synchronous rotation of these trapezoidal threaded spindles 32 of the adjustment elements 29, the two cages 28 attached to them can be centrally adjusted with the links.

Synchronous rotation can be achieved as in the present case by toothed belt pulleys 34 (one per adjustment element 29) and a toothed belt 35 (not drawn here), or alternatively by gears and shafts, or other means for synchronous drive. It can be activated manually by a crank or motorized by a drive.

As an alternative to the preferred spindle drive, eccentrics or eccentric discs or spiral discs or parallelogram guides with push rods and levers for centric adjustment could also be used to adjust the distance between the cages 28.

FIG. 8 also provides an upper guide 36, which can be engaged with the small parts 17 from above the support surface 2. This upper guide 36 can be used where necessary at critical points of the conveyor line, such as in steep inclines up to the vertical or even overhanging conveyor sections (where the support surface 2 faces downwards); or in the infeed and discharge area of the chain conveyor, where closures can push each other and collide.

It is important that the carriers 14, especially their stability and rigidity, are very precisely adapted to the small parts 17 to be transported and their weight and size, in order to prevent the small parts from slipping through unintentionally.

To reduce contamination and infection with germs of the small parts 17 on the conveyor chain, the conveyor chain is surrounded by an enclosure 25. This here is constructed in two parts, wherein each part can be opened and closed by pivoting. The enclosure 25 may be transparent, for example made of polycarbonate, so that the processes inside the enclosure can be observed.

Figure 10:
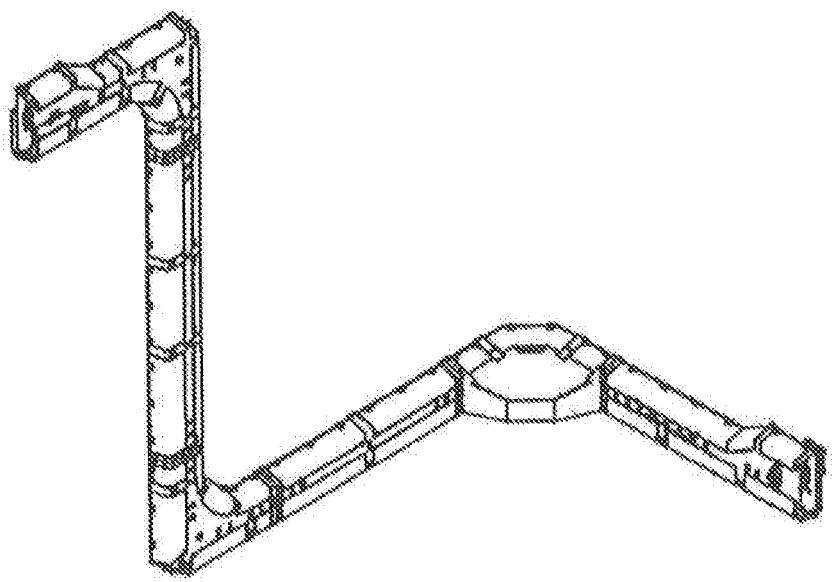
FIG. 10 shows a perspective view of a chain conveyor.

FIG. 10 shows a perspective view of a possible chain conveyor surrounded by an enclosure 25. Four straight conveyor sections are provided here, each of which merges into the other by a 90° deflection, wherein the deflections are either made by the chain guide profiles 20 themselves or by rotatable guide discs (curved discs) or deflection discs, as can be seen from the corresponding shape of the enclosure at the bottom right-hand corner during the first deflection.

Figure 11:
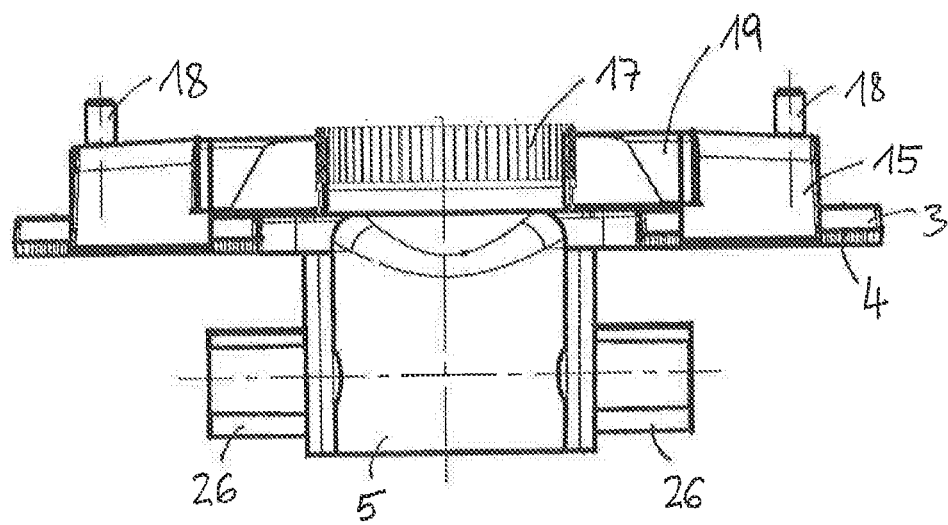
FIG. 11 shows a chain link in front view with a flat small part (closure)
Figure 12:
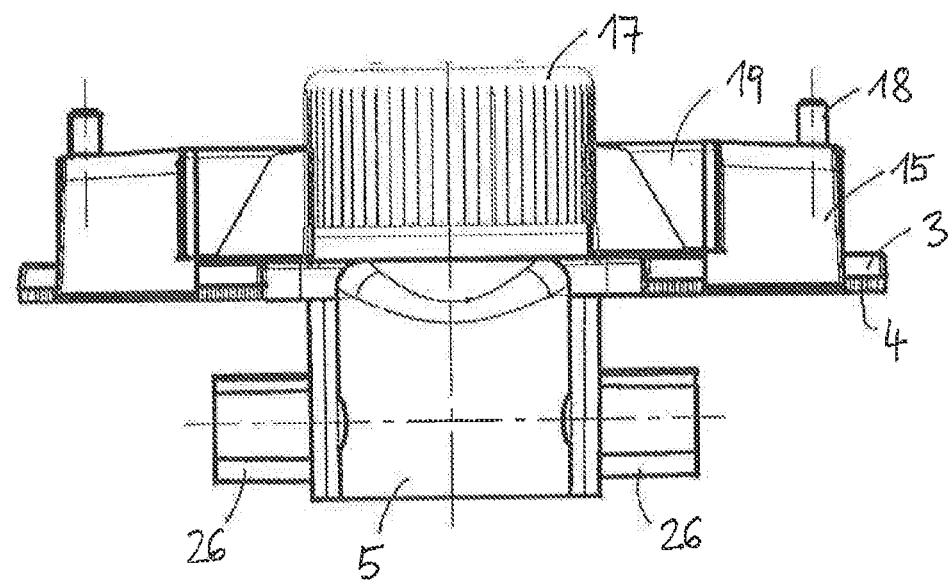
FIG. 12 shows a chain link in front view with a medium-high small part (closure)
Figure 13:
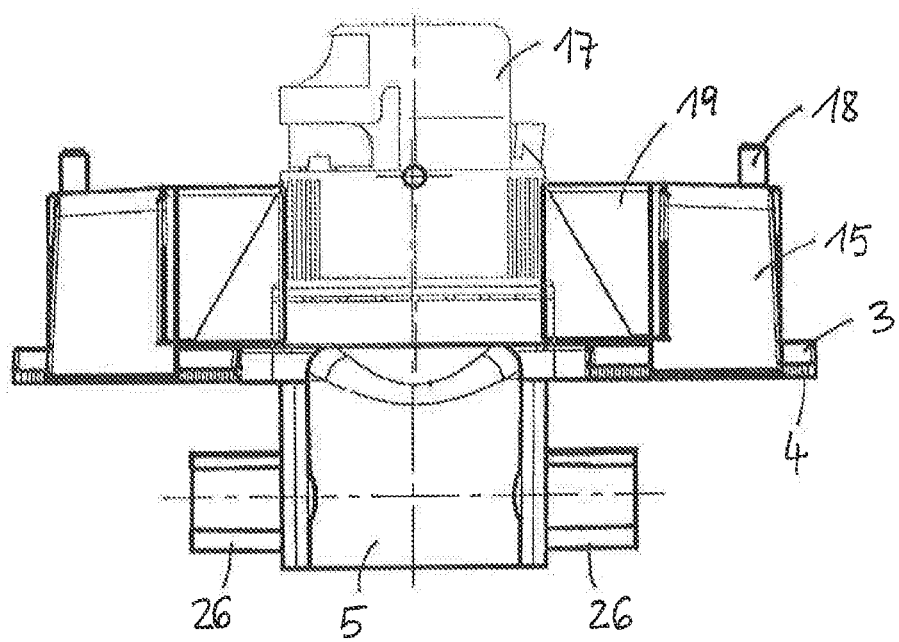
FIG. 13 shows a chain link in front view with a high small part (closure)

FIGS. 11-13 show the same chain link 1 in each case, in particular with the same projections 3, although the carriers 14 are designed differently in each figure. The carrier 14 in FIG. 11 has the lowest height, the gripping part 19 and the fastening part 15 are at the same height at the top, but are slightly less high than the small part (bottle closure) 17. The carrier 14 in FIG. 12 is higher than that in FIG. 11, the gripping part 19 and the fastening part 15 are at the same height at the top again, the small part (bottle closure) 17 protrudes over the carrier 14. The carrier 14 in FIG. 13 has the greatest height, accordingly the gripping part 19 and the fastening part 15 are also designed higher, wherein here too the small part (bottle closure) 17 protrudes beyond the carrier 14.

Figure 14:
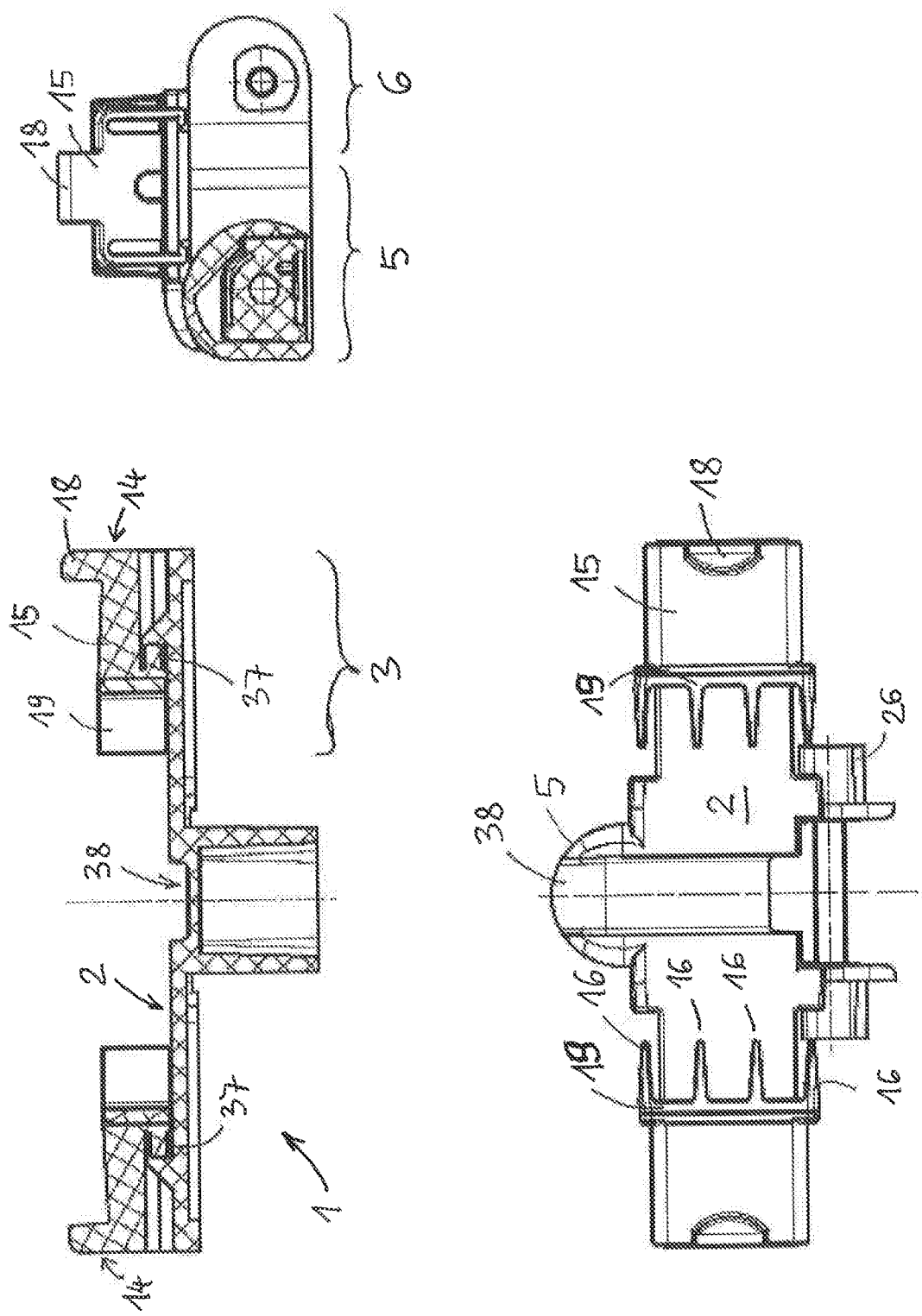
FIG. 14 shows a chain link with spring elements, with the carriers in the maximum open position, shown in cross-section, in partially cut side view and top view.

FIG. 14 shows a chain link in which the carriers 14 are pretensioned with spring elements 37, i.e. are pulled towards each other by the spring elements 37. One spring element 37 is provided per carrier 14. The spring element 37 is surrounded by the carrier 14 and the chain link 1, more precisely its projection 3. Here the spring element 37 is arranged in a recess on the underside of the carrier 14. Here the spring element 37 is supported outwards by a projection of chain link 1 or its projection 3. The spring element 37 is designed as a cylindrical spring. The carriers are shown here in the maximum open position. This can be achieved if the carriers are pushed outwards by means of their actuating means 18 by displacement means 21, such as links.

The gripping part 18 of the carrier 14 has four thin extensions 16 and is particularly suitable for sensitive small parts 17. A groove 38 is provided in the middle of the support surface 2 in the conveying direction. So here, chain-link 1 at its upper side will show a central arranged depression, a wide groove 38. This serves to improve the transfer into a closure groove following the direction of conveyance according to the invention or into another conveying element or into another device at the end of the conveying line. The conveyor chain consisting of the chain links 1 runs e.g. over a deflection wheel (this can also be the drive wheel), and a removal wedge or a removal blade engages in this groove 38 in the conveying direction, so that the material to be conveyed, i.e. small parts such as a closure, does not follow the curve of the conveyor chain, but is pushed straight on over the removal wedge or the removal blade.

The feeding of small parts 17 onto the chain links L at the beginning of the conveyor line can also be carried out by means of groove 38 and with an appropriate feeding wedge or feeding blade. However, the task can also be performed by means of a gravity chute, e.g. diagonally from above.

Otherwise the chain link 1 and the carriers 14 in FIG. 14 are designed in the same way as in FIGS. 1 to 13. However, a toothing 4 at the projection 3, as in FIGS. 1-3, is then not necessary. If there is a toothing 4 on the projection 3, spring elements 37 could still be used if the carrier 14 has no toothing and can therefore slide on the projection 3.

Figure 15:
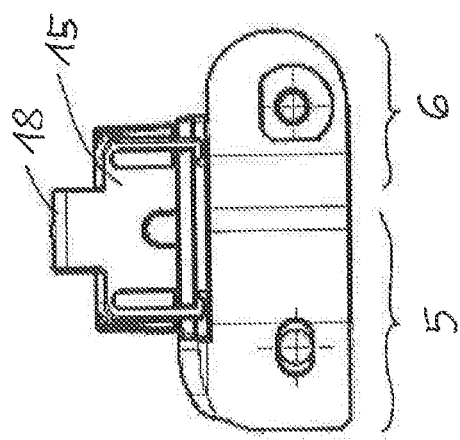
FIG. 15 shows the chain link from FIG. 14, with the carriers in the closed position.
Figure 15:
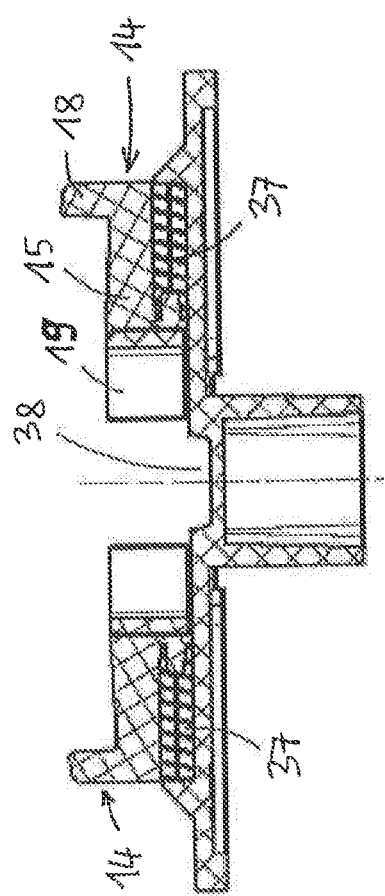
Figure 15:
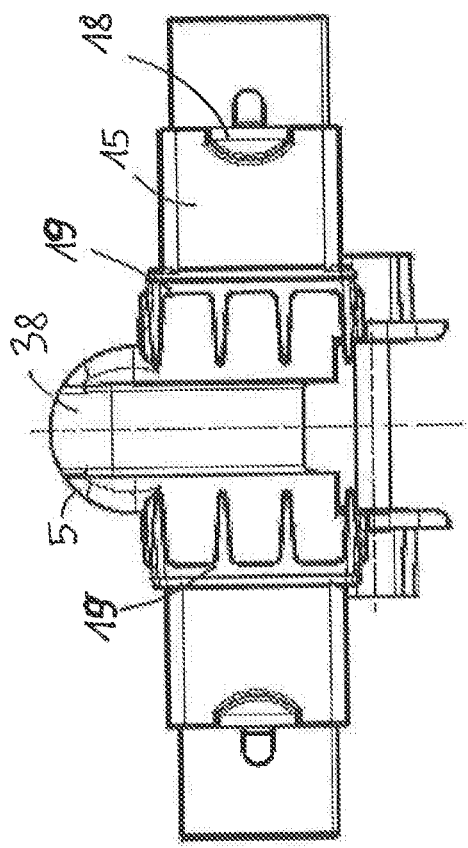

FIG. 15 shows the chain link from FIG. 14, wherein the carriers 14 are shown here in the closed position. This means that the spring elements 37 are in a relaxed, non-compressed state. The distance between the two carriers 14 is the minimum possible here.

Figure 16:
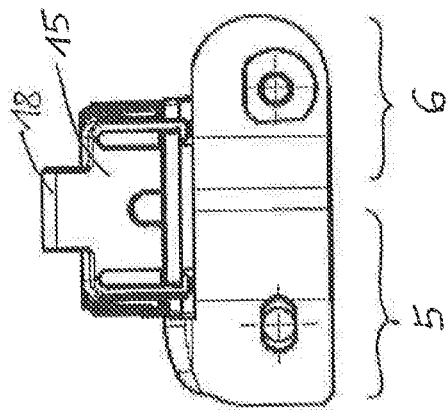
FIG. 16 shows the chain link from FIG. 14, with the carriers in a possible holding position.
Figure 16:
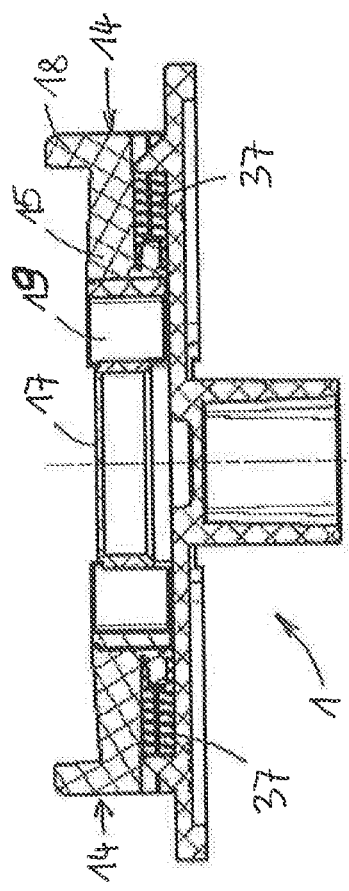
Figure 16:
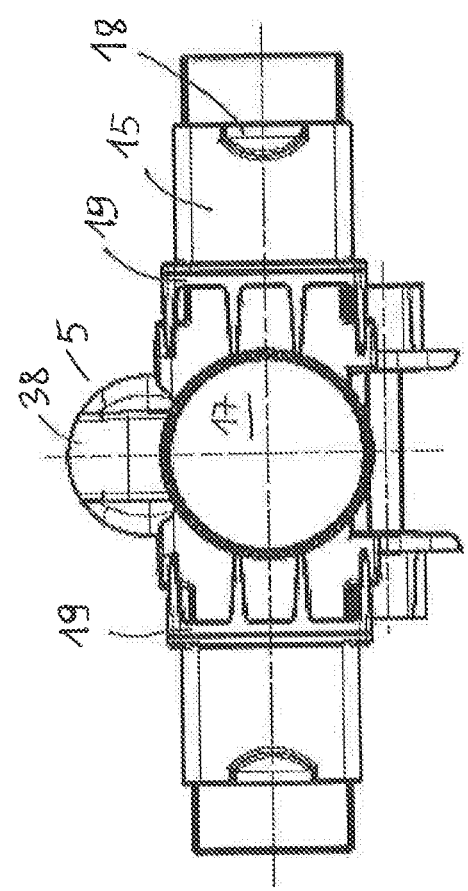

In FIG. 16 the chain link from FIG. 14 or 15 is shown in a possible holding position where a small part 17 is located between the carriers 14. The small part 17 slightly compresses the spring elements 37 which keep the small part 17 in its position.

FIGS. 17 to 22 show different embodiments of gripping parts. The gripping part 19 in FIG. 17 has here exactly one extension 16 made of elastic material for holding small parts 17, wherein the extension 16 touches the small part 17 with a flat boundary surface. The cross-section of the only extension 16 deviates slightly from the rectangular shape here, the cross-section is trapezoidally extended towards the other carrier 14. The dimension of the extension 16 in conveying direction 12 is larger than that of the fastening part 15. This gripping part 19 is suitable for robust small parts 17, is particularly hygienic and easy to use and to manufacture.

Figure 18:
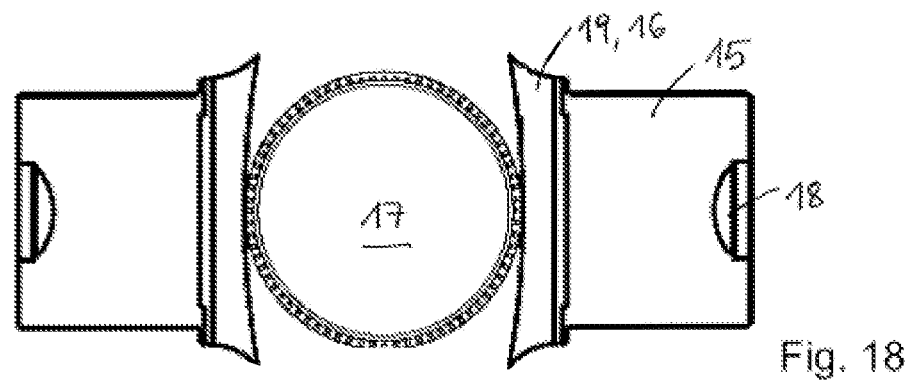

In FIG. 18, the gripping part 19 has an approximately trapezoidal cross-section with a curve on the long side that is oriented towards the small part 17. The gripping part 19 thus forms a curved extension 16 made of elastic material and can at least partially enclose the small part 17 with its curvature. The curvature of the gripping part 19 is considerably less than that of the small part 17. The gripping part 19 in FIG. 21 is similar to FIG. 18, but is less long in conveying direction 12.

Figure 19:
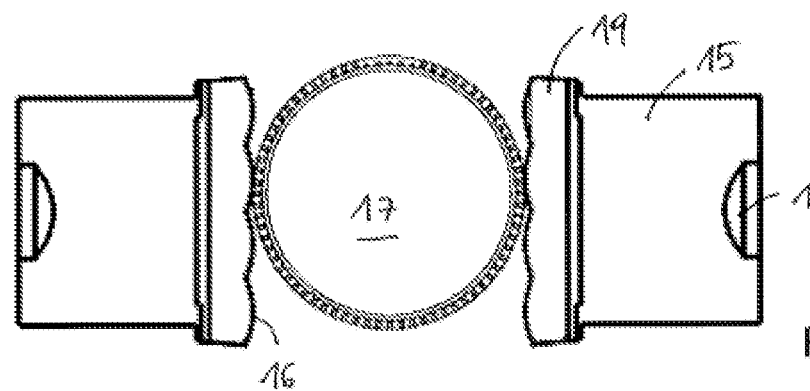
Figure 20:
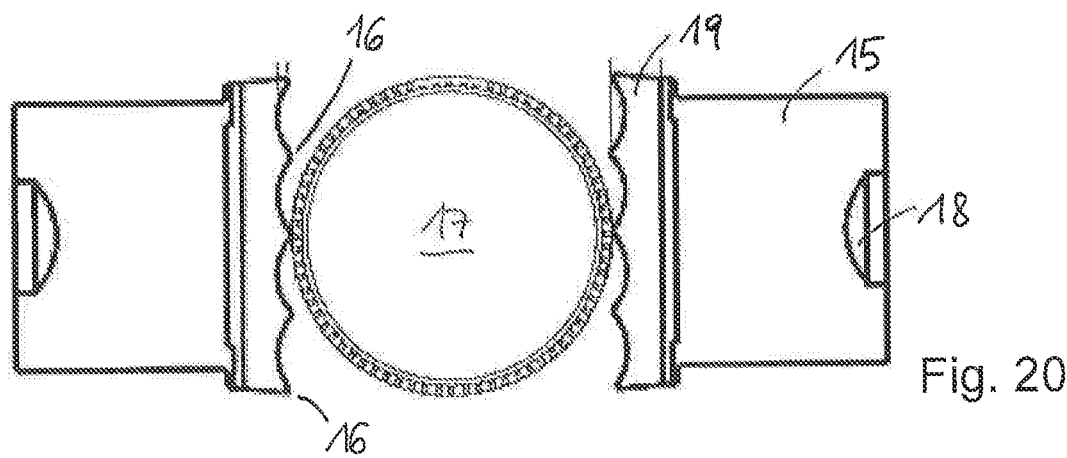
Figure 22:
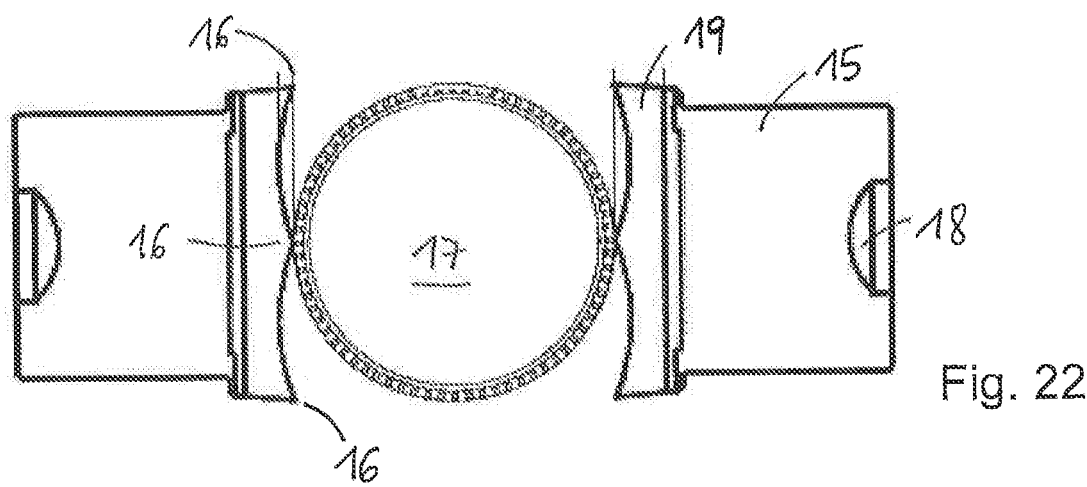

The gripping part 19 of FIG. 19 has four circular arc-shaped extensions 16, wherein the curvature of the circular arcs is directed outwards, towards the small part 17, and the circular arcs are aligned on a straight line. Of course, more or less than four circular arc-shaped extensions 16 could be used. FIGS. 20 and 22 have five and three pointed extensions 16 respectively, which are also formed by four and two arcs respectively, the curvature of which is directed inwards. The circular arcs are again aligned on a straight line, the tips of the extensions 16 are thus disposed on a straight line.

Figure 17:
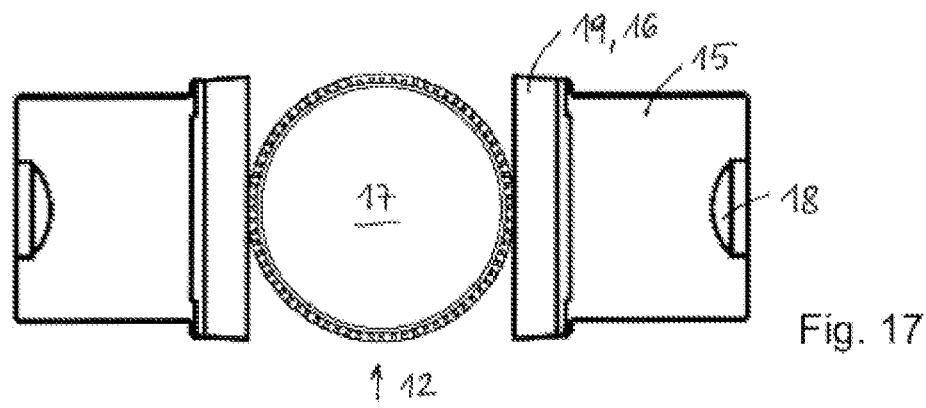
FIGS. 17 to 22 show different embodiments of gripping parts for carriers.
Figure 21:
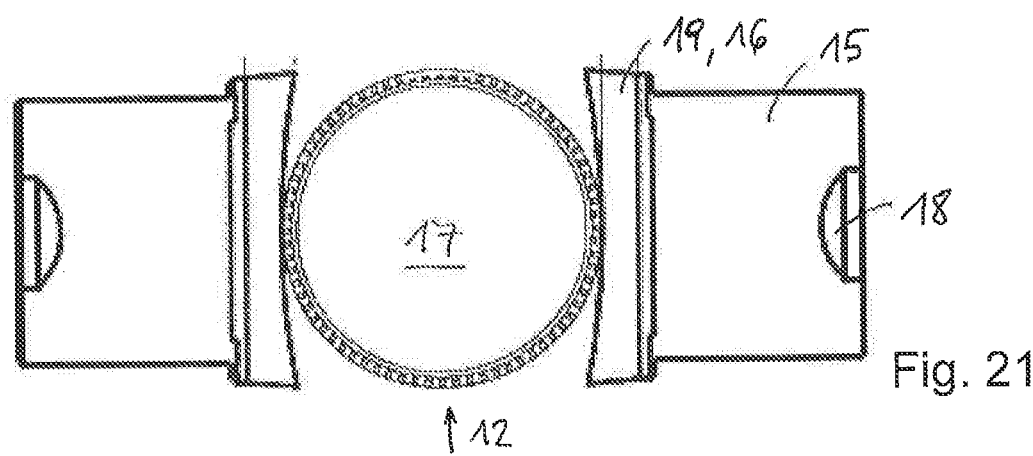

The gripping parts 19 of FIGS. 19, 20 and 22 have a better grip than the gripping parts of FIGS. 17, 18 and 21 with a greater softness of the extensions 16.

It would also be conceivable to attach two carriers with different gripping part 19 to each chain link 1 of a conveyor chain. For example, seen in conveying direction 12, on the left-hand side smooth gripping parts 19 (only one extension, see carrier in FIG. 17), and on the right-hand side with fingered extensions 16 (several extensions, see e.g. FIGS. 14-16 or FIGS. 1-3). Any other left/right combinations are also possible.

However, preferably for all chain links 1 of a conveyor chain, all gripping parts 19 or extensions 16 should be identical on the left and also on the right.

LIST OF REFERENCE NUMERALS

1 Chain link
2 Support surface
3 Projection (means for fitting a carrier 14)
4 Toothing
5 Head part
6 Fork part
7 Leg
8 Bore (opening)
9 Chain pin
10 Cavity in head part 5
11 Traction piece
12 Conveying direction
13 Elongated hole (opening)
14 Carrier
15 Fastening part
16 Extensions of the gripping part 19
17 Small part
18 Actuating means (bolt) on the fastening part 15
19 Gripping part
20 Chain guide profile
21 Displacement means (link)
22 Protrusion at the projection 3
23 Fastening lugs
24 Retaining bar of the fastening part 15
25 Enclosure
26 Bore stub
27 Ribs in the fastening part 15
28 Cage for the displacement means (link) 21
29 Adjustment element for the displacement means (link) 21
30 Spacer element
31 Screw
32 Trapezoidal thread spindle
33 Guide element
34 Toothed belt pulleys
35 Toothed belt
36 Upper guide
37 Spring element
38 Groove

The invention claimed is:

1. A chain link for a chain conveyor for conveying small parts, in particular bottle closures, having a, in particular flat, support surface (2) for small parts, wherein means for fitting at least one carrier are provided on opposite sides of the chain link, wherein at least two carriers are provided, each having a fastening part which can be fitted onto a means for fitting, and a gripping part, which is made of a softer material than the fastening part and has one or more extensions which, when the carrier is in the fitted state, are directed towards the respective other carrier.

2. The chain link according to claim 1, wherein the means for fitting a carrier are formed as wing-like projections which are aligned transversely to a conveying direction of the chain link.

3. The chain link according to claim 1, wherein the means for fitting have a toothing.

4. The chain link according to claim 1, wherein on the side of the chain link facing away from the support surface at least one head part is provided as well as one fork part with two legs opposite the head part in the conveying direction, wherein the fork part is designed such that the head part of a chain link can be inserted between the legs of the fork part of a following chain link.

5. The chain link according to claim 4, wherein the head part and the fork part, in particular its legs, have openings for accommodating a chain pin for the articulated connection of two chain links.

6. The chain link according to claim 4, wherein the head part has a cavity for accommodating a traction piece rotatable in the cavity, wherein an axis of rotation of the traction piece normal to the conveying direction of the chain link, in particular normal to the support surface, is defined by the design of the cavity, and wherein the openings in the head part are designed as elongated holes aligned in the conveying direction in order to define a maximum angle of rotation.

7. The chain link according to claim 6, wherein a traction piece is additionally provided which is guided and rotatable in the head part and has a bore normal to its axis of rotation, which is aligned with the openings of the head part, namely the elongated holes.

8. The chain link with carriers according to claim 1, wherein the fastening part is designed for displacement on the means for fitting.

9. The chain link with carriers according to claim 8, wherein retaining bars serving as guide rails for the means for fitting are provided on the fastening part.

10. The chain link with carriers according to claim 1, wherein the fastening part has an actuating means for displacement on the means for fitting.

11. The chain link with carriers according to claim 1, wherein the fastening part is designed to latch onto the means for fitting.

12. The chain link with carriers according to claim 1, wherein the gripping part has a plurality of finger-shaped or lobe-shaped extensions of elastic material for holding small parts.

13. The chain link with carriers according to claim 1, wherein gripping part has or forms exactly one extension of elastic material for holding small parts, which extension is designed to contact a small part with at least one flat boundary surface in the fitted state of the carrier.

14. The chain link with carriers according to claim 1, wherein the gripping part has exactly one curved extension of elastic material for holding small parts, which extension is designed to at least partially enclose a small part with its curvature in the fitted state of the carrier.

15. The chain link with carriers according to claim 1, wherein the gripping part is made of one piece.

16. The chain link with carriers according to claim 1, wherein the fastening part and the gripping part are manufactured in one piece by a common manufacturing process, such as a two-component injection molding process.

17. The chain link with carriers according to claim 1, wherein the carriers are pretensioned in the fitted state towards the respective opposite carrier by spring elements.

18. A conveyor chain comprising a plurality of successive chain links according to claim 1.

19. The conveyor chain according to claim 18, wherein the chain links are formed and in each case a head part of one chain link is connected to the fork part of the following chain link by means of a chain pin.

20. The conveyor chain according to claim 19, wherein the chain links additionally have a traction piece, which is guided and rotatable in the head part, wherein a chain pin is located in the bore of the traction piece.

21. The chain conveyor comprising a conveyor chain according to claim 18 and at least one drive.

22. The chain conveyor according to claim 21, wherein chain guide profiles are provided at least in sections on both sides of the conveyor chain parallel to the conveying direction, on which profiles the conveyor chain rests with its means for fitting of at least one carrier.

23. The chain conveyor according to claim 21, comprising chain links and carriers, wherein displacement means, in particular links which are fixed relative to the conveyor chain, are provided, with which the actuating means can be contacted for displacing the carriers along the means for fitting.

24. The chain conveyor according to claim 23, wherein the displacement means are adjustable transversely to the conveying direction in order to be able to set a predetermined distance between two opposite carriers of a chain link.

25. The chain conveyor according to claim 23, wherein the distance between the conveyor chain and displacement means is adjustable to ensure engagement between the displacement means and carriers of different heights.

26. A use of a chain conveyor according to claim 21 for conveying closures, in particular bottle closures, made of plastic or metal.

27. The chain link according to claim 1, wherein a groove is provided in a center of the support surface in a conveying direction, so that at the end of a conveying section, a removal wedge or a removal blade can engage in the groove in the conveying direction and small parts can be pushed straight on over the removal wedge or the removal blade.

* * * * *